United States Patent
Taylor et al.

(10) Patent No.: US 7,162,560 B2
(45) Date of Patent: Jan. 9, 2007

(54) PARTITIONABLE MULTIPROCESSOR SYSTEM HAVING PROGRAMMABLE INTERRUPT CONTROLLERS

(75) Inventors: Billy K. Taylor, Columbia, SC (US); Mohan J. Kumar, Aloha, OR (US); Wilson E. Smoak, Columbia, SC (US); David J. O'Shea, Costa Mesa, CA (US); Bassam N. Coury, Olympia, WA (US); Priscilla Lam, Portland, OR (US); Tom Slaight, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 457 days.

(21) Appl. No.: 10/751,250

(22) Filed: Dec. 31, 2003

(65) Prior Publication Data

US 2005/0144434 A1    Jun. 30, 2005

(51) Int. Cl.
*G06F 13/24* (2006.01)
*G06F 15/00* (2006.01)

(52) U.S. Cl. .................... 710/266; 710/260; 712/13

(58) Field of Classification Search .................. 713/2, 713/1, 100; 709/220; 710/260, 266; 712/13
See application file for complete search history.

(56) References Cited

U.S. PATENT DOCUMENTS

| | | | | |
|---|---|---|---|---|
| 6,772,259 B1 * | 8/2004 | Corrigan et al. | ............ | 710/260 |
| 6,788,511 B1 * | 9/2004 | Bikulcius et al. | ............. | 361/92 |
| 6,915,370 B1 * | 7/2005 | Rankin et al. | ............. | 710/305 |
| 6,952,749 B1 * | 10/2005 | Kim | .......................... | 710/260 |
| 6,961,761 B1 * | 11/2005 | Masuyama et al. | ......... | 709/220 |

* cited by examiner

*Primary Examiner*—Thomas Lee
*Assistant Examiner*—Suresh K Suryawanshi
(74) *Attorney, Agent, or Firm*—Carrie A. Boone, P.C.

(57) ABSTRACT

A system that may optionally be partitioned into multiple domains is disclosed. Each domain is capable of independently powering on, executing a firmware program, and loading an operating system, including a legacy operating system, as well as running an application program that is distinct from programs running on another domain. Interrupts, including boot interrupts, reset handlers, and interchassis communications are initialized differently, depending on whether the system is to be partitioned or not. The cost of redundant hardware and/or firmware is substantially avoided, yet the system fully supports multiple domains.

12 Claims, 14 Drawing Sheets

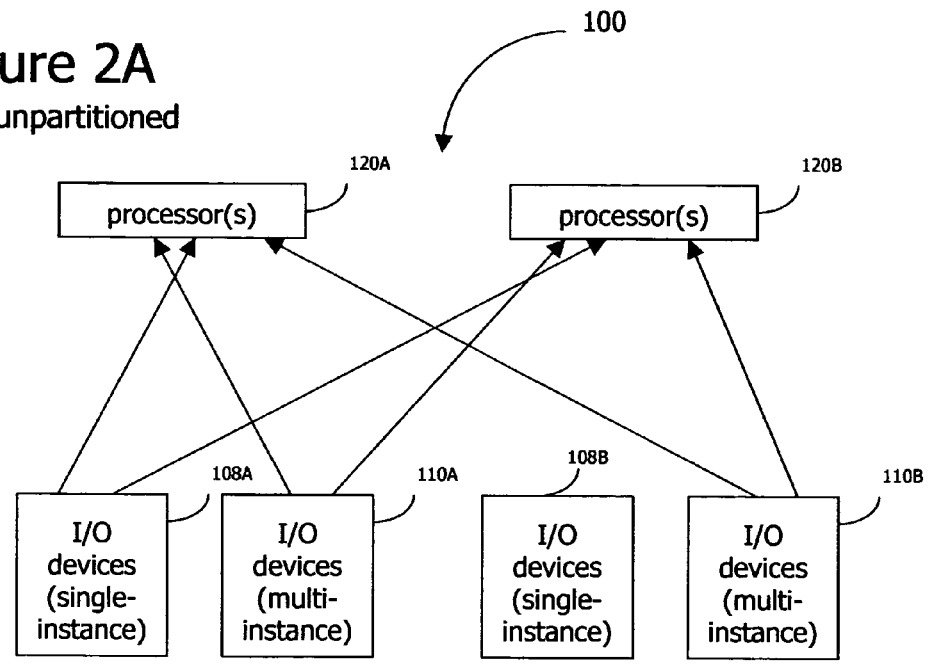
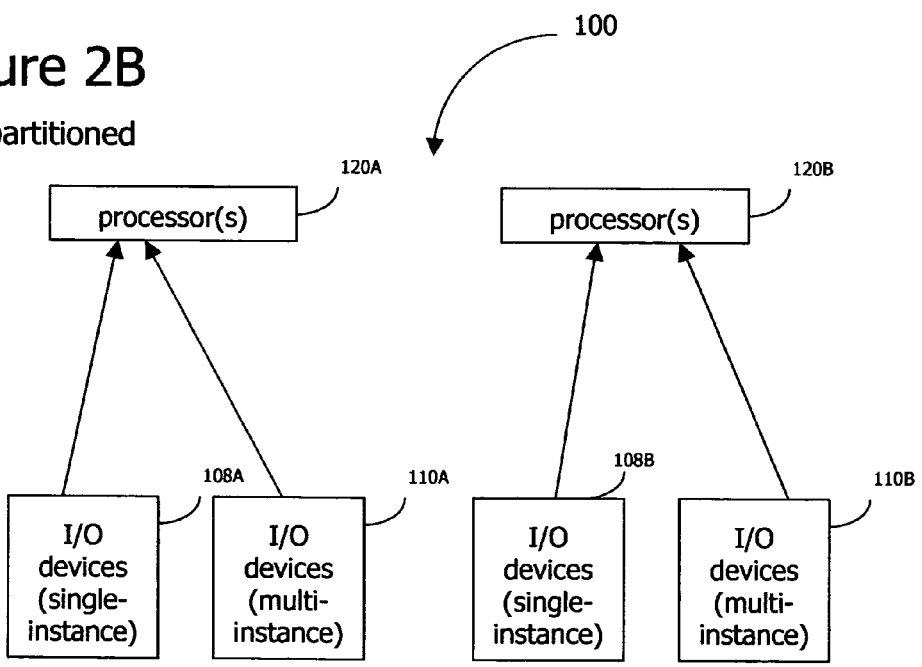

unpartitioned system partitioned system

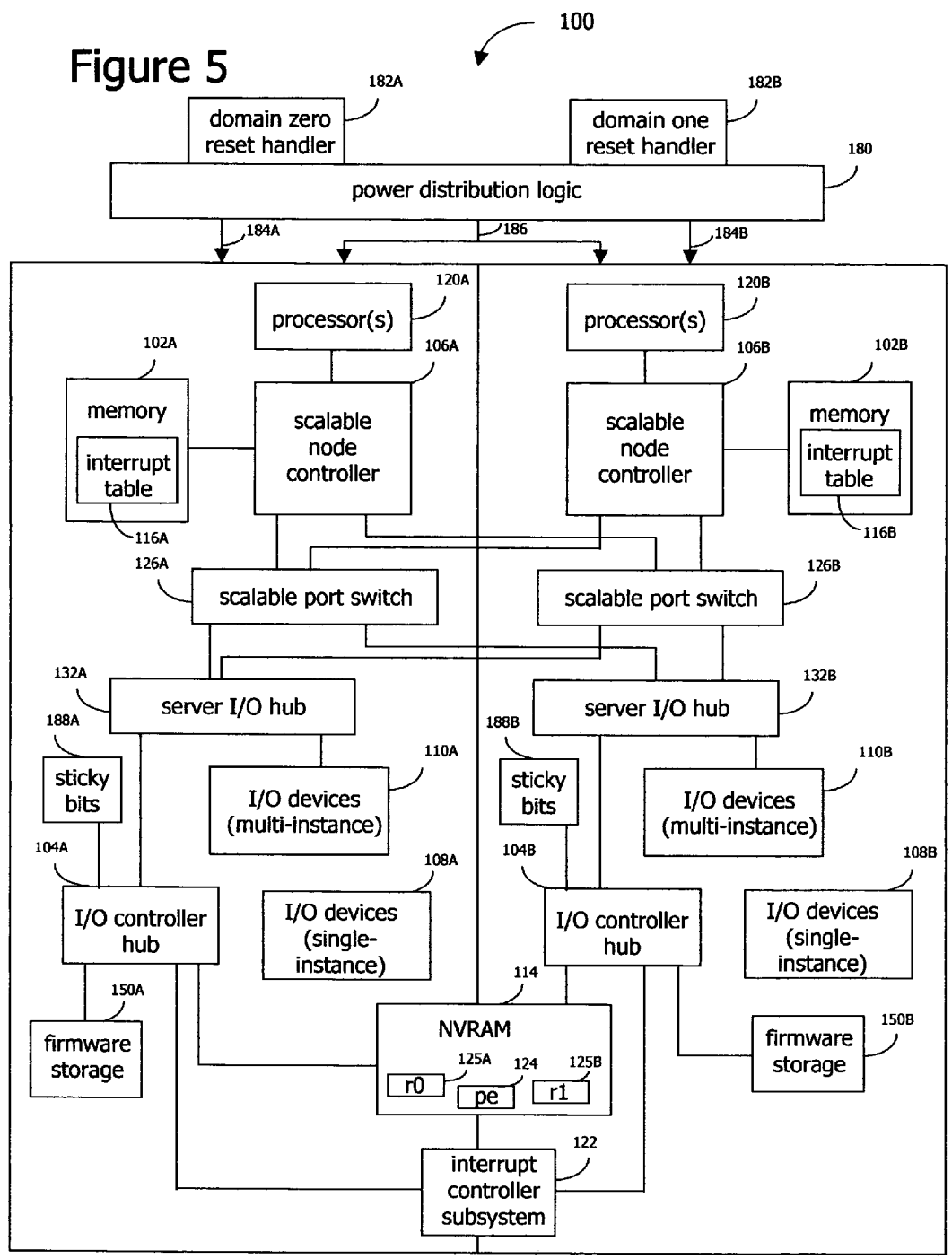

N-domain-partitioned system

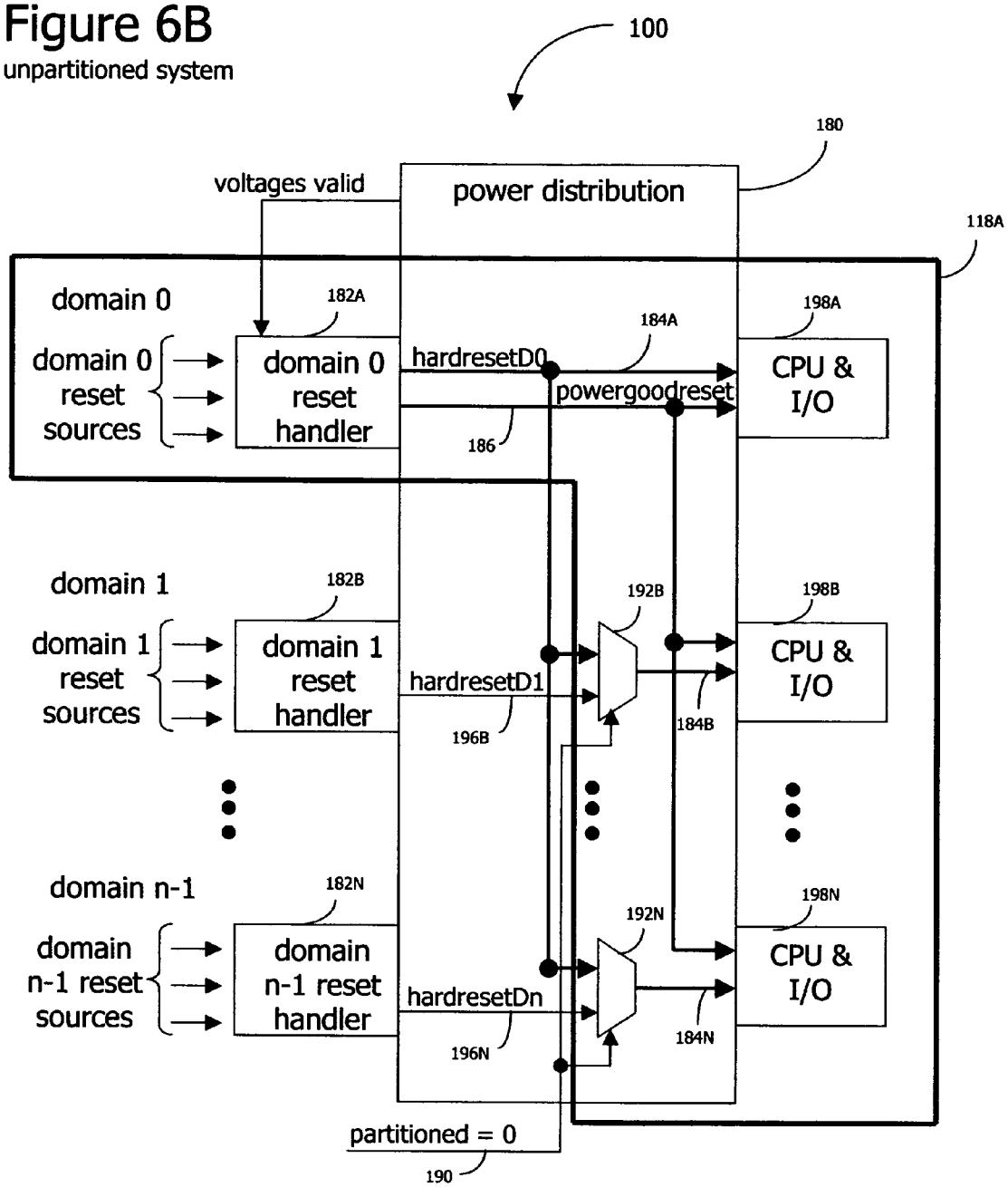

PARTITIONABLE MULTIPROCESSOR SYSTEM HAVING PROGRAMMABLE INTERRUPT CONTROLLERS

FIELD OF THE INVENTION

This invention relates to multiprocessor system, and, more particularly, to systems which are partitionable into multiple domains.

BACKGROUND OF THE INVENTION

Multiprocessor systems, that is, systems employing two or more microprocessors, can be used for a variety of computing tasks. Often featuring specialized hardware, operating systems, and/or application software, multiprocessor systems are available in several different forms.

Symmetric multiprocessing (SMP) is the use of multiple microprocessors managed by a single operating system. Each microprocessor has access to the same memory and is linked by a common bus. In some SMP systems, each microprocessor has its own cache, and cache coherency problems may be resolved using bus snooping and bus mastering techniques.

Massively parallel processing (MPP) is another multiprocessing environment, in which each processor or group of processors on a system has its own memory and operating system. A single application program may simultaneously be executed by the different microprocessors. Certain applications, such as relational database software, may realize significant gains in throughput using MPP. Still other MPP systems may operate multiple application programs simultaneously, one program executed by each microprocessor or group of microprocessors. A combination of SMP and MPP schemes is also possible within a multiprocessing system.

A single chassis of a multiprocessor system may be able to simultaneously support multiple domains. A domain results from the partitioning of a multiprocessor system into two or more independent microprocessor-based subsystems. Each domain is a discrete entity within the system, which includes at least one microprocessor, and may include dedicated memory, input/output (I/O) devices, and other modules, such that the domain operates wholly independent of other domains, yet occupies the same system enclosure, which may include one or more chassis. The independent operations include the execution of programs such as firmware, to initialize the domain, operating system (OS), to run in the domain, and application software, also to run in the domain.

To support partitioning, the system board or boards, which are enclosed within a single chassis, may include multiple chipsets such that, when partitioning is invoked, a dedicated portion of the chipset operates within each domain. When the system is unpartitioned, the combined parts of the chipset may be accessible to all the microprocessors. Although physically present, a part of the chipsets may be dormant, or unused, in the unpartitioned state.

As one option, the various chipset components, buses, slots, and connectors within the partition-capable computer system may be replicated, one for each domain. Such redundancy may not be cost-effective for some applications. Further, the partitioning of a partition-capable system is often an optional feature, such that the system is expected to seamlessly transition between and operate within either a single-domain system or a multi-domain system.

Like server and other high-end systems, partitionable computer systems are produced using legacy (personal computer compatibility) hardware and initialization firmware, sometimes for cost savings, but more often to maintain backwards compatibility with software that expects to see legacy hardware interfaces. Examples of legacy hardware include the interrupt controller, timer, reset hardware, and various other devices that only support a fixed address decode. Legacy firmware is firmware executed during system initialization that requires the presence of the legacy hardware. This includes the firmware boot interrupt control sequence, reset and initialization sequences, and so on. Some of the legacy functionality may conflict with the partitioning of the multiprocessor system.

Thus, there is a continuing need to provide a partitionable multiprocessor system that overcomes the shortcomings of the prior art.

BRIEF DESCRIPTION OF THE DRAWINGS

FIGS. 2A and 2B are block diagrams illustrating the relationship between I/O devices and processors in the unpartitioned and partitioned states, respectively, of the partitionable system of FIG. 1, according to some embodiments;

FIG. 5 is a block diagram of the partitionable system of FIG. 1, including power distribution logic and reset handlers, according to some embodiments;

FIGS. 6A and 6B are block diagrams of the power distribution logic of FIG. 5 when the system is partitioned and when the system is not partitioned, respectively, according to some embodiments;

DETAILED DESCRIPTION

In accordance with some embodiments described herein, a multiprocessor system that may optionally be partitioned into at least two domains, each domain having at least one processor, is disclosed. Each domain is capable of independently powering on, executing a firmware program, and loading an operating system, as well as running an application program that is distinct from programs running on another domain.

During system initialization, or power-up, firmware running within the system ascertains whether the system is to be partitioned or not. Interrupt routing, including boot interrupts, reset handlers, and inter-chassis communication pathways are established by the firmware according to the partition election. The operations occur seamlessly during firmware initialization. The cost of redundant hardware and/or firmware is substantially avoided, yet the system fully supports multiple domains.

In the following detailed description, reference is made to the accompanying drawings, which show by way of illustration specific embodiments in which the invention may be practiced. However, it is to be understood that other embodiments will become apparent to those of ordinary skill in the art upon reading this disclosure. The following detailed description is, therefore, not to be construed in a limiting sense, as the scope of the present invention is defined by the claims.

Figure 1:
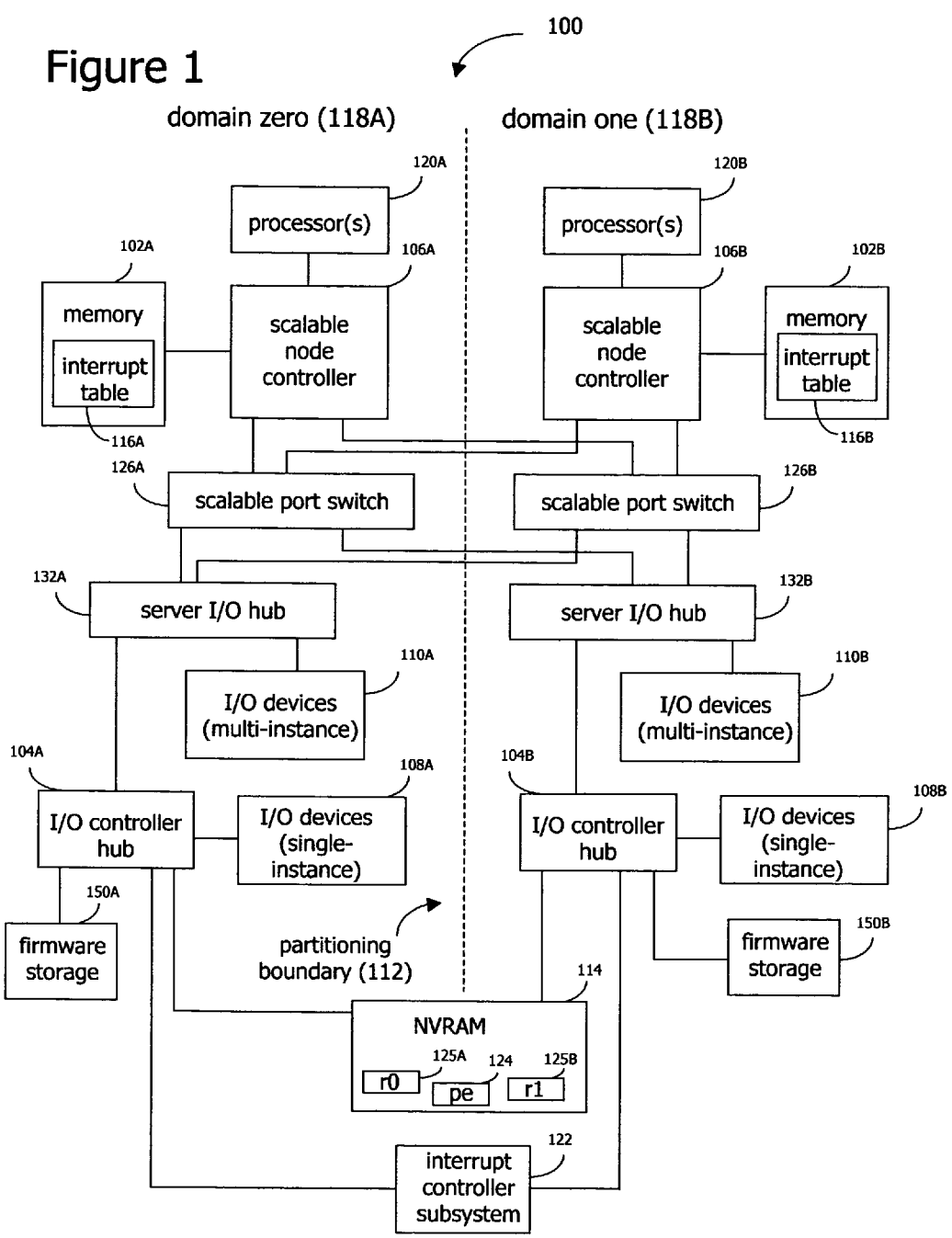
FIG. 1 is a block diagram of a partitionable system including firmware for performing an interrupt distribution method, according to some embodiments.

In FIG. 1, a partitionable system 100 is depicted, according to some embodiments. The system 100 is a multiprocessor system that includes a partition-capable chipset, such as the E8870 chipset. (The E8870 chipset is a product of Intel Corporation, of Santa Clara, Calif.) For ease of discussion, the system 100 will be described as being partitionable into two distinct domains, domains zero and one, each having at least one processor. However, the principles described herein may be extended to more than two domains, in which each domains may include multiple processors.

The system 100 includes processor(s) 120A and 120B (collectively, processors 120), shown on either side of a hypothetical partition boundary 112. When the system 100 is partitioned, processor(s) 120A are part of a domain 118A (known herein as domain zero 118A) and processor(s) 120B are part of a domain 118B (known herein as domain one 118B). When the system 100 is not partitioned, the processors 120 collectively operate as part of a multiprocessing computing environment, such as a server system.

The system 100 includes a scalable node controllers 106A and 106B (collectively, scalable node controllers 106), scalability port switches 126A and 126B (collectively, scalability port switches 126), and server I/O hubs 132A and 132B (collectively, server I/O hubs 132). The scalable node controllers 106, scalability port switches 126, and server I/O hubs 132 are configured so as to either unite or divide various components of the system 100, depending upon whether the system is partitioned or unpartitioned. The scalable node controllers, the scalability port switches, and the server I/O hubs may be part of a chipset, such as the E8870 chipset.

Although the scalability port switches (SPSs) 126 appear to be allocated per domain, they are not. When the system 100 is partitioned, half of the SPS 126A and half of the SPS 126B goes to domain zero. Similarly, the other half of the SPS 126A and the other half of the SPS 126B goes to domain one.

The system 100 includes a memory 102A, connected to the scalable node controller 106A and a memory 102B, connected to the scalable node controller 106B (collectively, memory 102). When the system is partitioned, the memory 102A is accessible by the processor(s) 120A (in domain zero 118A) while the memory 102B is accessible by the processor(s) 120B (in domain one 118B). When the system 100 is not partitioned, the combined memory 102 is accessible by all of the processors 120 in the system 100.

In domain zero 118A, an I/O controller hub 104A is connected to the server I/O hub 132A. Likewise, in domain one 118B, an I/O controller hub 104B is connected to the server I/O hub 132B. A firmware program 150A and a firmware program 150B (collectively, firmware 150) are connected to their respective I/O controller hubs in each domain. The firmware 150A and 150B may be executed when the system 100 is powered up. The firmware performs initialization such that one or more operating systems can be executed by the system. Initialization may include, but is not limited to, performing hardware detection and/or testing, obtaining configuration information, and performing device initialization. The firmware 150 may reside in a non-volatile medium, such as read-only memory (ROM), electrically erasable programmable memory (EEPROM), or flash memory, all of which retain the firmware information when the system 100 is powered down.

Firmware Interrupt Configuration for Partitionable System

Each firmware program 150A and 150B maintains an interrupt table. Interrupt table 116A is maintained by the firmware 150A for domain zero 118A while interrupt table 116B is maintained by the firmware 150B for domain one 118B, within the system 100. The interrupt table 116A is stored in the memory 102A while the interrupt table 116B is stored in the memory 102B, as shown in FIG. 1.

A special non-volatile random access memory (NVRAM) device 114 in retains configuration information about the system 100. The NVRAM 114, which is connected to the respective I/O controller hub 104 in each domain, is accessible from either domain when the system is partitioned. Thus, the NVRAM is a multi-domain element of the system 100. Other non-volatile storage technologies, including, but not limited to, programmable read-only memory (PROM), electrically erasable PROM, flash memory, and so on, may be used instead of the NVRAM, according to the particular system design.

NVRAM is typically initialized when the system is first configured, and updated when the configuration changes. NVRAM is separately powered, such as by a small battery, and, thus, in contrast to the memory 102, the NVRAM 114 retains information through a power cycle (i.e., system is powered off, then on again) of the system 100. When the system 100 is partitioned, the NVRAM 114 is accessible from either domain zero 118A or domain one 118B.

As shown in FIG. 1, the multi-domain NVRAM 114 retains a partition enable (PE) bit 124, which indicates the partition election of the system, i.e., whether the system 100 is to be partitioned or not. The NVRAM further retains a reset zero (R0) bit 125A and a reset one (R1) bit 125B. The R0 and R1 bits are used when transitioning the system from a partitioned to a non-partitioned state, according to some embodiments.

The system 100 includes one or more I/O devices. I/O devices are divided into two classes: single-instance devices 108A and 108B (collectively, single-instance I/O devices 108) and multi-instance I/O devices 110A and 110B (collectively, multi-instance I/O devices 110). The single-instance I/O devices 108 are connected to the I/O controller hub 104 while the multi-instance I/O devices 110 are connected to the server I/O hub 132 of their respective domains. Single-instance and multi-instance I/O devices are initialized differently by the firmware 150, depending on the partition election.

The single-instance I/O devices 108 are those devices, such as the keyboard and mouse, which typically exist in one place in a computer system. When the system 100 is not partitioned, the single-instance I/O devices 108A (in domain zero) are initialized while the single-instance I/O devices 108B (in domain one) are not initialized. Thus, some of the single-instance I/O devices are unused when the system 100 is not partitioned. When the system 100 is partitioned, the single-instance I/O devices 108A are initialized (for use in domain zero 118A), and the single-instance I/O devices 108B are initialized (for use in domain one 118B). Thus, when the system 100 is partitioned, all single-instance I/O devices may be used.

Multi-instance I/O devices 110, such as network interface controllers (NICs), may have any number of instantiations in a computer system. While multi-instance I/O devices 110A may be accessible to processor(s) 120A when the system 100 is partitioned, the same devices may be accessible to processor(s) 120B when the system is not partitioned. Thus, whether the system 100 is partitioned or not, all of the multi-instance I/O devices 110 may be operable upon initialization. FIG. 1 is illustrative; the actual number, type, and physical location of I/O devices assigned to each domain is dependent on system interconnect and chipset capability and/or limitations.

The system 100 further includes an interrupt controller 122, accessible to both domains of the system 100 via the respective I/O controller hubs 104 of each domain. The interrupt controller 122 allows interrupts from the I/O devices 108 and 110 to be delivered to the processors 120, as designated by the firmware 150A and 150B, respectively, during initialization. Specialized circuitry, including front-side bus interrupt delivery architecture (APIC and SAPIC) is used in conjunction with the E8870 chipset, to route interrupt messages, in some embodiments. (The APIC and SAPIC chipsets are interrupt controllers found in products of Intel Corporation, of Santa Clara, Calif.) The interrupt controller 122 is described in more detail in FIGS. 4A and 4B, which are described below.

Most processor-based systems use interrupts for communication between an I/O device and a processor. The I/O device issues an interrupt, informing the processor that the I/O device needs attention. Once the processor responds to the interrupt, communication between the I/O device and the interrupt has been established. Systems generally have an allotment of interrupt request (IRQ) designations, each of which may be assigned to one or more I/O devices. Such assignments may be made by the firmware when the system is powered up.

In a partitionable system, the interrupt assignments may be steered differently, depending on the partition election. In the system 100, for example, the single-instance I/O devices 108 are steered differently when the system is partitioned than when the system is not partitioned. When the system 100 is partitioned, the interrupt controller 122 delivers interrupts to domain zero 118A and to domain one 118B. When the system 100 is not partitioned, interrupts from the interrupt controller 122 may be routed anywhere within the system.

As depicted in the block diagrams of FIGS. 2A and 2B, the firmware 150 initialization effectively establishes relationships between the I/O devices and the processors, when the system 100 is unpartitioned (FIG. 2A) and partitioned (FIG. 2B). In the unpartitioned state (FIG. 2A), the firmware 150 assigns interrupts for the single-instance I/O devices 108A in domain zero 118A, but not the single-instance I/O devices 108B that would be allocated for domain one 118B if the system was partitioned. Assignments are made for all multi-instance I/O devices 110. Both sets of processors 120A and 120B can receive interrupts from the I/O devices 108A, 110A, and 110B, but neither processor(s) receive interrupts from the I/O devices 108B.

In the partitioned state (FIG. 2B), the firmware 150 assigns interrupts for all I/O devices, but separates them according to domain. Thus, interrupt table 116A includes assignments for the I/O devices 108A and 110A in domain zero 118A. The processor(s) 120A can be interrupted by devices 108A and 110A, but not by devices 108B and 110B. Likewise, interrupt table 116B includes assignments for the I/O devices 108B and 110B in domain one 118B. The processor(s) 120B can be interrupted by devices 108B and 110B, but not by devices 108A and 110A.

Figure 3:
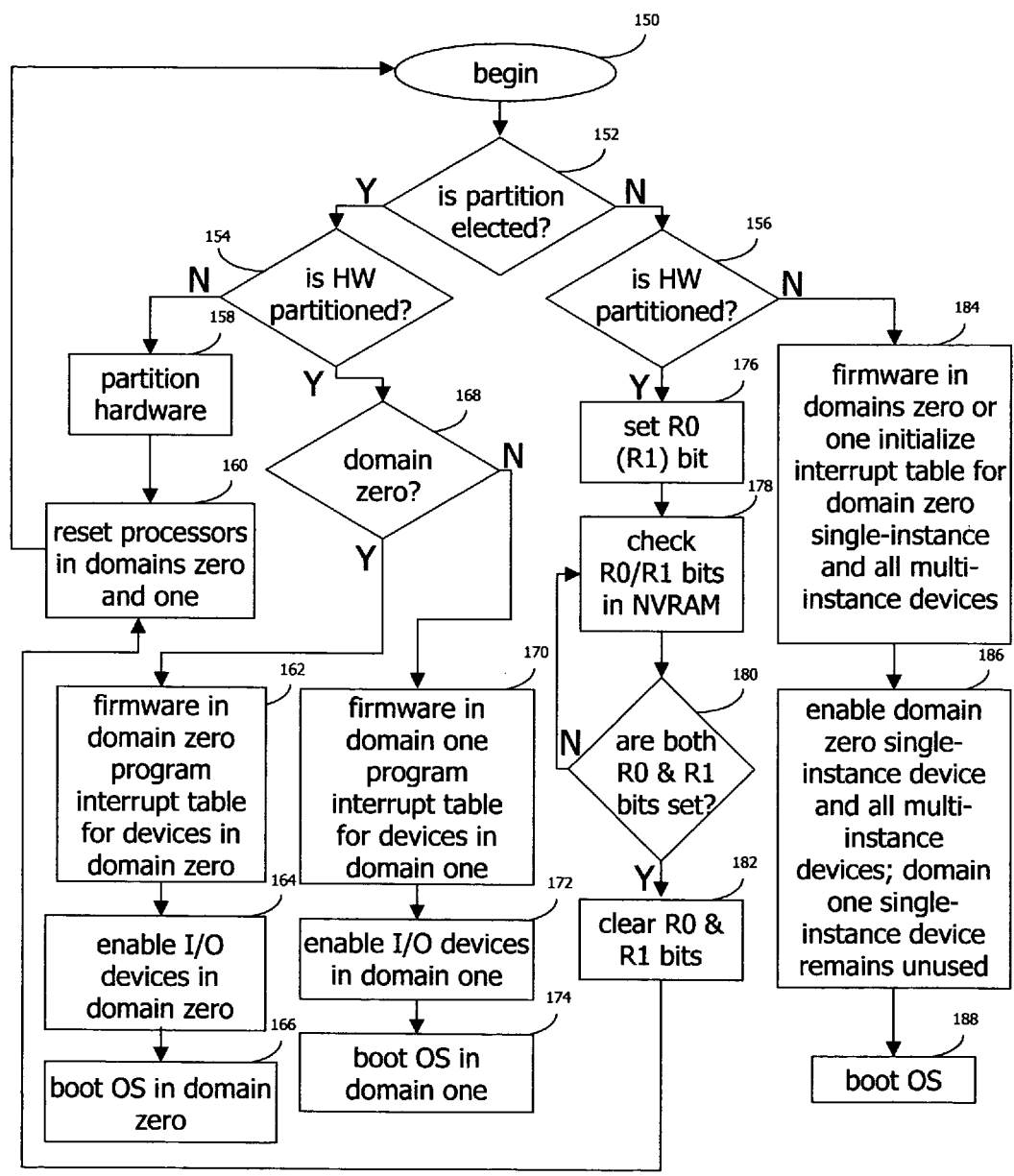
FIG. 3 is a flow diagram illustrating operation of the firmware of FIG. 1, according to some embodiments.

The flow diagram of FIG. 3 illustrates a method for assigning interrupts to I/O devices in the partitionable system 100, such that legacy operating systems can successfully run, according to some embodiments. As used herein, a legacy operating system, also known as an industry standard or "shrink-wrap" operating system, is an operating system that is not specifically designed to run on partitionable systems. Upon initialization, the firmware 150 communicates the interrupt configuration of the system 100 to the operating system(s) using the interrupt tables 116. By manipulating the tables 116 during power-up, the system 100 is thus initialized so that legacy operating systems may run unchanged.

The firmware 150 distributes interrupts for the unpartitioned system (FIG. 2A) or for the partitioned system (FIG. 2B), according to the partition election. Various embodiments may utilize fewer or more steps than those depicted in FIG. 3, and the firmware execution may be performed using a number of different implementations, depending on the application. The firmware 150 checks the NVRAM 114 or other non-volatile storage location, for a partition election, such as the partition enable bit 124. Further, the firmware 150 checks the hardware configuration of the system. The operations of FIG. 3 are performed, based upon these initial inquiries.

By checking the NVRAM 114, the firmware 150 ascertains the partition election of the system 100 (block 152). If partitioning is elected (the "yes" prong of block 152), the firmware 150 determines whether the hardware has been partitioned (block 154). If not (the "no" prong of block 154), the firmware 158 partitions the hardware into the two domains 118A and 118B (block 158). (Hardware partitioning may be initiated by writing to a chipset register, for example.) The processors 120A and 120B are reset (block 160), and the process is firmware operation is repeated, from the beginning, this time with the hardware partitioned.

If the hardware is already partitioned (the "yes" prong of block 154), the firmware 150 initializes the respective interrupt table and I/O devices for each domain. The firmware 150 maintains two interrupt tables, one (116A) for domain zero 118A, and another (116B) for domain one 118B. For domain zero 118A (the "yes" prong of block 168), the firmware 150A initializes the interrupt table 116A and I/O devices 108A and 110A and for domain one (the "no" prong of block 168), the firmware 150B initializes the interrupt table 116B and I/O devices 108B and 110B. Since the system is partitioned into two distinct domains, the operations of blocks 162, 164, and 166 may occur simultaneously with operations in blocks 170, 172, and 174.

More particularly, in domain zero 118A, the firmware 150A programs the interrupt table 116A within the memory 102A for the single-instance I/O devices 108A and the multi-instance I/O devices 110A (block 162). The I/O devices 108A and 110A in domain zero are then enabled (block 164). Once the devices have been enabled, the operating system (OS) residing in domain zero is booted (block 166). The operation of initializing the I/O devices in domain zero is thus complete.

In domain one 118B, similar operations are performed by the firmware 150B. The firmware 150B programs the interrupt table 116B within the memory 102B for the single-instance I/O devices 108B and the multi-instance I/O devices 110B (block 170). The I/O devices 108B and 110B in domain one 118B are then enabled (block 172). Once the devices have been enabled, the operating system (OS) residing within domain one is booted (block 174). The operation of initializing the I/O devices in domain one is thus complete.

Where partitioning has not been elected (the "no" prong of block 152), the firmware ascertains whether the hardware is partitioned (block 156). Where the hardware is partitioned (the "yes" prong of block 156), there are two domains, domain zero 118A and domain one 118B, operating independently and possibly simultaneously. The operations of blocks 176, 178, 180, and 182 may thus be performed from within each domain in a similar fashion. In domain zero 118A (domain one 118B), the firmware 150A (150B) sets the reset zero, or R0, bit 125A (reset one, or R1, bit 125B) (block 176).

Recall that the R0 and R1 bits are used when transitioning from the partitioned to an unpartitioned state. The firmware 150 then checks the R0 bit 125A (R1 bit 125B) in the NVRAM 114 (block 178), to see if both bits are set or not (block 180). Where both bits are not set (the "no" prong of block 180), the firmware continues to check the NVRAM until both bits are set (the "yes" prong of block 180). Thus, each domain is waiting for the other domain to set its respective reset bit before the hardware can be unpartitioned. Once both bits are set, they both may be reset (block 182) by the firmware. (The reset may be performed by the firmware 150A or the firmware 150B.) The processors in both domains are then reset as well (block 160).

Where partitioning is not elected (the "no" prong of block 152) and the hardware is not partitioned (the "no" prong of block 156), the system 100 is completely unpartitioned. One of the interrupt tables is arbitrarily used when the system is unpartitioned, such as the interrupt table 116A in domain zero. The firmware running on the unpartitioned system, such as the firmware 150A then initializes the interrupt table 116A for the single-instance I/O devices 108A, the multi-instance I/O devices 110A, and the multi-instance I/O devices 110B (block 184). The single-instance I/O devices 108B are not used when the system 100 is unpartitioned. The firmware then enables the devices 108A, 110A, and 110B that were included in the table 116A (block 186).

Once the I/O devices have been initialized, the operating system is booted (block 188). Since the system 100 is not partitioned, a single operating system is available for execution. The operating system, which may be a legacy operating system, is booted by the firmware, a procedure in which the firmware relinquishes control of the system such that one of the processors, such as a processor in domain zero, executes operating system instructions rather than firmware instructions. The process for initializing the I/O devices is thus complete.

Thus, by identifying the partition election and hardware configuration of the system, the firmware automatically establishes the relationship between the I/O devices in the system and the processors during power-up. One or more interrupt tables are updated according to the partition election, the hardware configuration, the available I/O devices, and the number of partitionable domains. Once control is passed from the firmware to the one or more operating systems, the relevant interrupt table reflects I/O device-processor arrangement determined by the firmware. This allows both legacy operating systems (without cognizance of the partition arrangement) and partition-capable operating systems to run successfully.

A system in a partitioned state may elect to cojoin two or more domains into a single domain. The system 100, for example, once partitioned into domains 118A and 118B, may be returned to its unpartitioned, or pre-partitioned state, by cojoining domains 118A and 118B. In such a case, the R0 125A and R1 125B bits in the NVRAM 114 are used for synchronization. Each domain will set its "reset" bit when individually ready to cojoin. Thus, the domain 118A will set the R0 bit 125A when ready to cojoin with the domain 118B; independently, the domain 118B will set the R1 bit 125B when ready to cojoin with the domain 118A. When both bits 125A and 125B in the system 100 are set, the system is synchronized so as to make cojoinment possible.

Boot Interrupt Steering for Partitionable System

Returning to FIG. 1, the arrangement of the scalable node controllers 106, the scalability port switches 126, and the server I/O hubs 132 facilitate the splitting of the system 100 into separate domains 118, in which the processor(s) 120A in domain zero 118A use the I/O devices 108A and 110A, while the processor(s) 120B in domain one 118B use the I/O devices 108B and 110B (the partitioned configuration). Or, the system 100 may be configured such that all the processors share all the enabled I/O devices (the non-partitioned configuration). The interrupt controller 122 of the system 100 is also affected by partitioning.

Boot devices are those I/O devices in the system from which an operating system may be invoked, or "booted." Examples of boot devices include fixed disk drives, such as Small Computer Systems Interface (SCSI) and Enhanced Small Device Interface (ESDI) drives, floppy drives, and Compact Disk Read-Only Memory (CD ROM) drives, to name a few. Universal Serial Bus (USB) devices, such as USB floppies or CDs, and some network devices are also bootable in some computer systems. Conceivably, several different I/O devices may be bootable; thus, a system may be initialized with many distinct boot interrupts during power-up.

As processor-based systems evolve, many add-in cards and other peripheral devices supported in legacy systems continue to be supported in the larger, more complex systems, such as servers. The ability to use legacy devices has dramatically lowered the total costs of owning a server system. Some of the mechanisms used by these legacy I/O devices, however, are not appropriate for server systems. While legacy operating systems can be booted by the resident firmware (option ROM) in the boot devices (e.g., the disk controller) supported by the server system, the boot device firmware assumes a legacy interrupt architecture that is incompatible with the present interrupt architecture of the server system.

The interrupt architecture of legacy systems employs a programmable interrupt controller (PIC), typically an Intel 8259 component, which is limited in capability relative to newer interrupt controllers. The PIC supports a small number of interrupt sources (eight per PIC), although PIC devices can be cascaded together to support additional sources. Further, the PIC is not designed with multiprocessing in mind, as it was designed for access by a single processor.

Server systems which employ multiprocessing may have many interrupt sources. A more sophisticated interrupt architecture, such as one using Intel's APIC device, may be found in these large computer systems. The APIC supports many more interrupts than the PIC and is designed to be simultaneously used by multiple processors. Further, the APIC includes interfaces that can appear and be accessed from each domain of a partitioned system.

To support legacy boot devices, server and other large computer systems may include both the PIC and the APIC in their design. During the boot phase, system interrupts are combined and presented to one or more inputs of the PIC device. This allows an operating system to be booted without changing the booting hardware device firmware. Where multiple processors are present in the server system, boot interrupts are presented to each processor in the system.

Where the server system supports partitioning, the situation gets more complex. In the non-partitioned configuration, the boot interrupts from all bootable devices are combined and presented to a PIC device that can deliver interrupts to all the processors within the unpartitioned system. (The PIC device may deliver the boot interrupts to all processors; however, a single processor, the bootstrap startup processor, services the interrupts.) In the partitioned configuration, there is a boot interrupt for each domain. So, the boot device interrupts in one domain are combined and delivered to the booting processor in that domain only, using a PIC device that is unique to that domain. Similarly, the boot device interrupts for subsequent domains are combined and delivered, so that the appropriate "boot" processor can accept or acknowledge the interrupts.

Figure 4A:
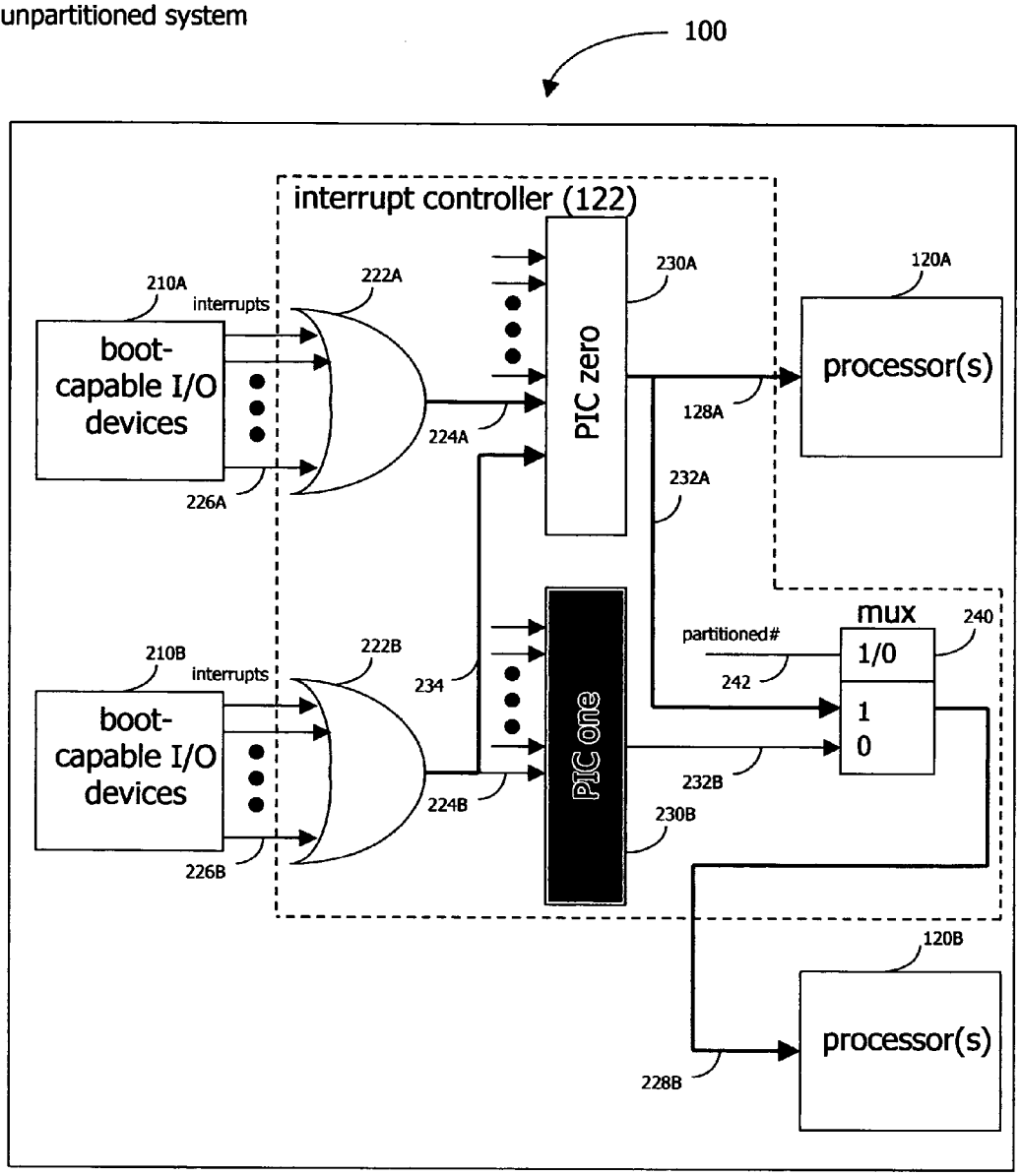
FIGS. 4A and 4B are block diagrams of the interrupt architecture of the system of FIG. 1, in its unpartitioned and partitioned states, respectively, according to some embodiments.
Figure 4B:
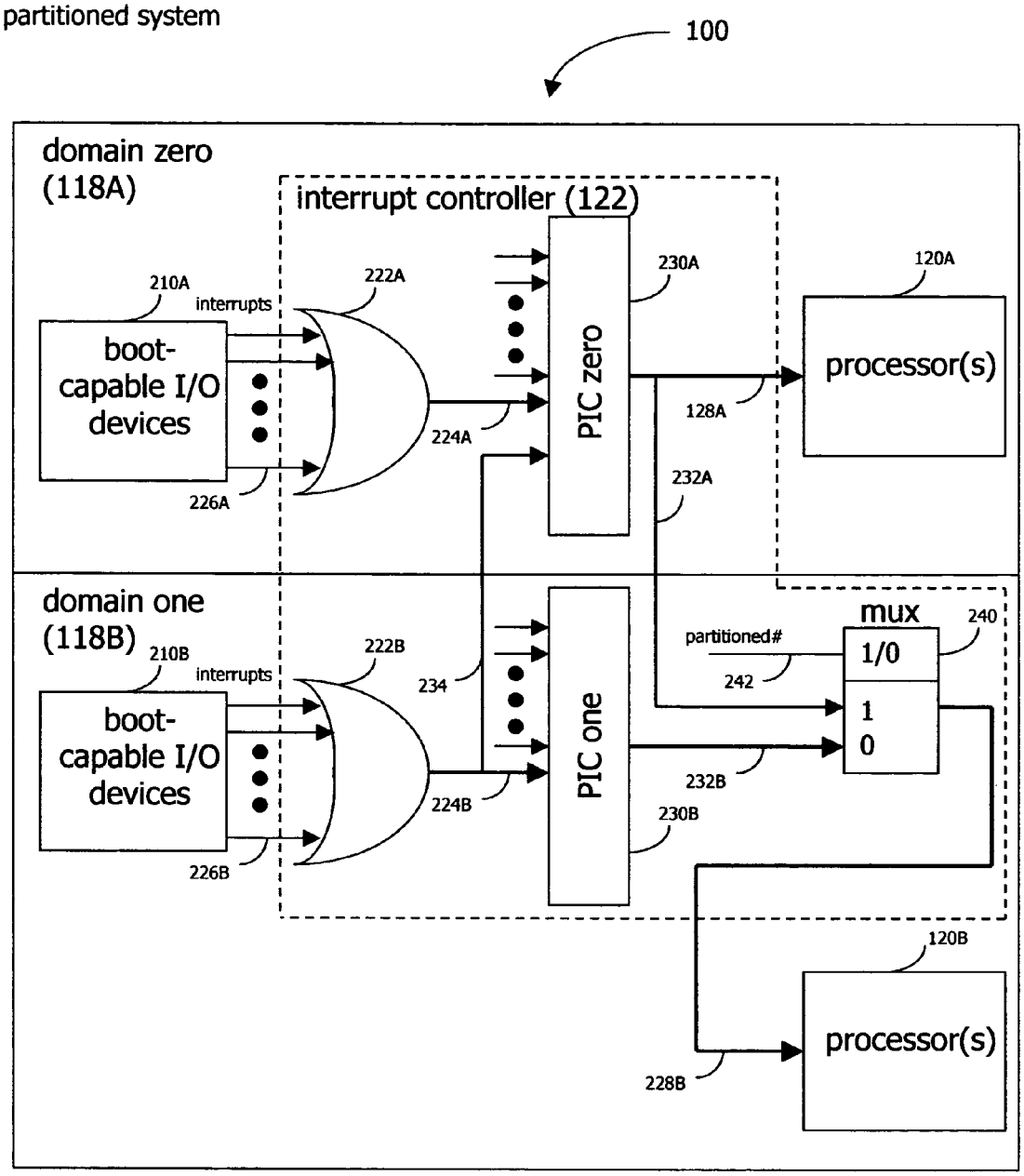

The system 100 of FIG. 1 supports booting a legacy operating system with a typical boot device, whether the system 100 is partitioned or not. In FIGS. 4A and 4B, the interrupt controller 122 of FIG. 1 is depicted in more detail, according to some embodiments. Although two domains 118A and 118B are shown in the partitioned system (FIG. 4B), the principles of FIGS. 4A and 4B can be extended to an N-domain system. Further, although an embodiment showing two PIC devices is described, multiple interrupt controllers may be envisioned, and the multiple interrupt controllers may reside in a single chip or may be composed of distinct discrete devices.

The interrupt controller 122 includes two PIC devices, PIC zero 230A for domain zero 118A, and PIC one 230B for domain one 118B. For an N-domain system, the interrupt controller 122 would have N PIC devices. An OR gate 222A receives interrupts from one or more boot-capable devices 210A in domain zero 118A. A second OR gate 222B, in domain one 118B, also receives interrupts from one or more boot-capable devices 210B.

The boot-capable devices 210A and 210B may be either single-instance I/O devices 108 or multi-instance I/O devices 110 (see FIG. 1). Interrupts 226A coming from any one of the boot-capable devices 210A are received into the OR gate 222A, to produce a single output signal 224A likewise, interrupts 226B coming from any one of the boot-capable devices 210B are received into the OR gate 222B, to produce a single output signal 224B.

Thickened lines in FIGS. 4A and 4B indicate how interrupts are routed when the system is unpartitioned and partitioned, respectively. When the system 100 is not partitioned (FIG. 4A), the boot interrupts from all bootable devices are combined and presented only to PIC zero 230A. Signal 234 is diverted from the output of the OR gate 222B, to be received into one of the unused inputs of PIC zero 230A. (Firmware 150 in the system 100 is capable of enabling the input to PIC one 230B when the system 100 is partitioned, and disabling the input when the system is unpartitioned.) The signal 224A, coming from the boot-capable devices 210A, is also presented to PIC zero 230A.

In this manner, PIC zero 220A processes all incoming interrupts from boot-capable devices within the system 100, when the system is unpartitioned. In response to an incoming interrupt, PIC zero 230A sends a signal 128A to interrupt the one or more processor(s) 120A.

While the output of PIC zero 230A connects to the processor(s) 120A, part of the signal 128A is diverted, as signal 232A, to the other processor(s) 120B. The interrupt controller 122 also includes a two-input multiplexer 240 for receiving the diverted signal 232A from PIC zero. A partitioned signal 242 controls the multiplexer 240. The partition enable bit 124 in the NVRAM 114 (FIG. 1) may control the partitioned signal 242. Or, the partitioned signal 242 may be controlled by system management firmware. The multiplexer 240 produces a single output signal 228B, to be received by the processor(s) 120B. Which input signal (232A or 232B) produces the output signal 228B depends on whether the system 100 is partitioned or not.

As already mentioned, PIC zero 230A processes all incoming interrupt requests. PIC one 230B is inactive, as indicated by the gray shading in FIG. 4A. When the system is not partitioned, PIC zero 230A interrupts all the processors, with the signal 128A interrupting the processor(s) 120A and the signal 232A, routed through the multiplexer as signal 228B, interrupting the processor(s) 120B. In the unpartitioned state, PIC one 230B is not operational.

In FIG. 4B, the operation of the interrupt controller 122 changes when the system 100 is partitioned. As FIG. 4B shows, the interrupt controller 122 is now shared by domain zero 118A and domain one 118B. PIC one 230B becomes active and processes all interrupts from the boot-capable I/O devices 210B in domain one 118B. PIC one 230B produces the output signal 232B, which passes through the multiplexer 240 as signal 228B, to be received by the processors 120B in domain one 118B. While PIC zero 230A continues to interrupt the processor(s) 120A in domain zero 118A when the system is partitioned, PIC zero does not interrupt the processor(s) 120B in domain one 118B. Instead, PIC one 230B interrupts the processors in domain one. In this manner, a boot interrupt is available for each domain.

The interrupt controller 122 thus operates differently, depending upon whether the system 100 is partitioned or not. When the system 100 is not partitioned, the boot interrupts from all bootable devices are combined and delivered to PIC zero 230A. When the system is partitioned, separate PIC devices are available in each domain to independently interrupt their respective processors.

Reset for Partitionable System

In FIG. 5, the partitionable system 100 first introduced in FIG. 1 is depicted, with additional components, according to some embodiments. The system 100 is a multiprocessor system that includes several partition-capable components, at least two processors 120, and a number of I/O devices 108 and 110. The system 100 may remain unpartitioned, or be partitioned into two distinct domains 118A and 118B.

Additionally, the system 100 includes power distribution logic 180, and domain zero and one reset handlers 182A and 182B, respectively (collectively, reset handlers 182). The power distribution logic 180 is common to all domains while a distinct reset handler 182 is available for each domain in the system 100.

The power distribution logic 180 is a collection of hardware, including power supplies and voltage regulators, which convert an alternating current (AC) source signal into one or more reliable direct current (DC) voltages, so as to drive the various circuitry of the system 100. The process of supplying power to the system is not instantaneous. From the moment that the system 100 is powered up, it may take several seconds before the appropriate voltage level is reached.

There are two types of reset signals that may be received by the system 100: a power good reset and a hard reset. When the system 100 is powered up, the power good reset is asserted to the system 100 until after all voltage rails in the system have reached their specified levels. Once the voltage levels are reached, the power good reset is negated. Power good reset is often associated with the initial powering on of a computer system. As shown in FIG. 5, a power good reset signal 186 is produced by the power distribution logic 180 and is received by both domain zero 118A and domain one 118B.

Hard reset is asserted to put a system into a known good state. Hard reset, which "reboots" the system 100, may be issued following a system hang, for example. The hard reset may be invoked by depressing a front panel button, by issuing a remote command to a system management microcontroller, or by using some proprietary method, typically by a system user. Application software may also invoke a hard reset. When the system is rebooted, the system firmware executes, causing the system to initialize as if it had just been powered up.

There are differences between rebooting the system and powering on the system. For one thing, when the system is rebooted, partition configuration information is not cleared and reinitialized, but remains unchanged from prior to the reboot. In the system 100, the hard reset is issued by the reset handler logic 182, not the power distribution logic 180. When the system 100 is partitioned, the domain zero reset handler 182A may issue a hard reset signal 184A. Likewise, the domain one reset handler 182B may issue a hard reset signal 184B. In this manner, a hard reset for each domain can be independently achieved.

To keep track of the configuration of the system 100, configuration/error bits 188A and 188B (collectively, configuration/error bits or "sticky" bits 188), are stored in each domain. In FIG. 5, the configuration/error bits 188 are maintained in volatile memory 102. Alternatively, the bits 188 may be kept in the NVRAM 114. The sticky bits 188 are used to keep track of the configuration of each domain in the system 100. Also, when error conditions arise, the sticky bits 188 are updated to reflect the error.

Since they are stored in volatile memory, the sticky bits 188 retain configuration/error information following a hard reset, but not following a power good reset, of the system 100. When a power good reset occurs, the sticky bits are cleared. When a hard reset occurs, the sticky bits maintain their pre-reset state.

Figure 6A:
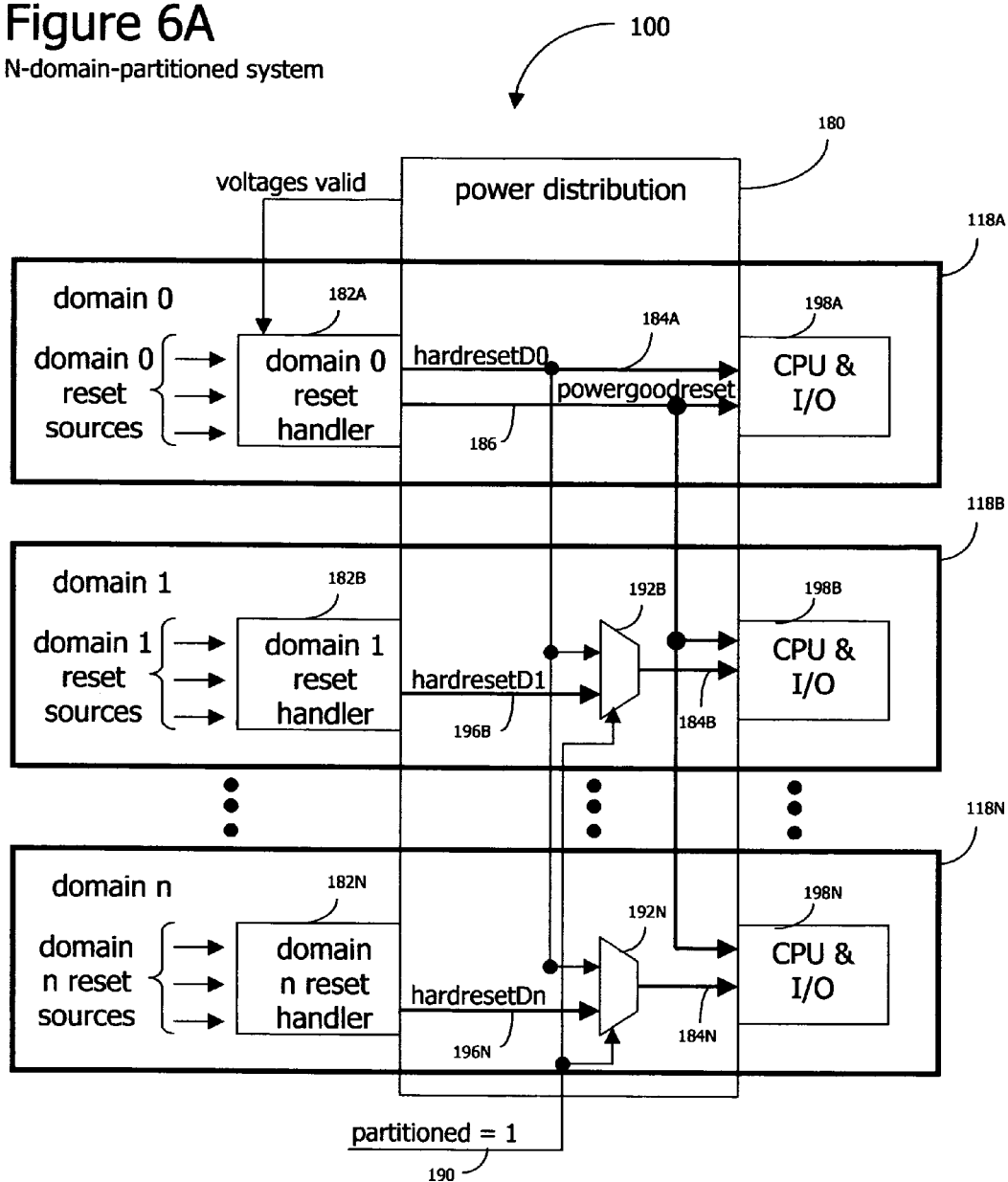

FIGS. 6A and 6B show the reset logic for the partitionable system 100 when the system is partitioned and unpartitioned, respectively. In these figures, an N-domain system is envisioned. Thickened lines indicate how signals are routed in both the partitioned and unpartitioned states.

In FIG. 6A, the system 100 is partitioned into N domains, domain 118A, 118B, . . . , and 118N, each having its own independent processor(s) and I/O circuitry 198A, 198B, . . . , and 198N, respectively. The processor and I/O circuitry 198A may include one or more processors, as well as single-instance I/O devices and multi-instance I/O devices, such as the processors 120 and the I/O devices 108 and 110 of FIG. 1. A common power distribution subsystem 180 is logically connected to all domains of the system 100.

Each domain has its own independent reset handling logic 182 to generate an independent hard reset for that domain. Reset handler 182A produces a hard reset signal 184A for domain zero 118A, to be received directly by the processor(s) and I/O circuitry 198A. Reset handler 182B produces a hard reset signal 196B for domain one 118B, which becomes the hard reset signal 184B when the system 100 is partitioned. Reset handler 182N produces a hard reset signal 196N for the Nth domain 118N, which becomes the hard reset signal 184N when the system is partitioned.

When the system 100 is partitioned, each domain operates independently, including the execution of distinct operating system programs. The source of an error condition may, for example, be an application program executing on one of the domains. When the error condition causes a hang, the condition only affects the domain in which the application program is running. By initiating a hard reset in the relevant domain, only the domain that is hung is rebooted. The other domains, which do not experience an error condition, are not unnecessarily subjected to a hard reset operation.

In FIG. 6A, a signal 190 drives two two-input multiplexers 192B and 192N (collectively, multiplexers 192). Each domain except domain zero 118A has a multiplexer 192, such that N-1 multiplexers are present in an N-domain system. In the examples of FIGS. 6A and 6B, the signal 190 indicates two possible system states: whether the system 100 is partitioned into N domains (FIG. 6A) or is unpartitioned (FIG. 6B). In other embodiments, the signal may indicate whether the system is unpartitioned, or partitioned into two domains. In still other embodiments, multiple signals may be fed to the multiplexers, to indicate several possible partition configurations. The partition enable bit 124 in the NVRAM 114 (FIG. 5) may control the signal 190.

Using domain one 118B as an example, when a hard reset is invoked, such as by pushing a front panel button, the reset handler 182B issues the signal 196B. The signal 196B is one of two inputs Into the multiplexer 192B. The other input to the multiplexer 192B is the hard reset signal 184A, from domain zero 118A. The hard reset signal 184A Is an input for each of the N-1 multiplexers 192.

The signal 190 determines which one of the two signals, 184A or 196B, invokes the hard reset for the domain 118B. In FIG. 6A, the signal 190 is driven high, such that the system is partitioned into N domains 118. Thus, the reset handler 182B, not the reset handler 182A in domain zero, invokes the hard reset for the processor(s) and I/O circuitry 198B within domain one 118B.

When the system is unpartitioned (signal 190 driven low), as in FIG. 6B, the signal 184A will initiate the hard reset. The domain zero reset handler 182A generates the hard reset signal 184B for the processor(s) and I/O circuitry 198B, as well as for all other processors and I/O circuitry of the system 100.

The hard reset logic of the system 100 thus ensures that the domain zero reset handler manages hard reset operations when the system is unpartitioned while each domain's dedicated reset handler manages hard reset operations when the system is partitioned. Those domains unaffected by the hang condition of another domain are thus not unnecessarily reset. When the system is unpartitioned, the reset handlers for the domains other than domain zero are unused.

The system 100 has one or more voltage rails, which feed voltages to the various circuits in the system. One voltage rail may supply 5V to a first group of circuits while another supplies 3V to a second group of circuits. Typically, these divisions are not related to the partition configuration of the system. In other words, circuits receiving 5V do not typically belong exclusively to a single domain while circuits receiving 3V belong to a second domain. It is more likely that each domain will include both 5V and 3V circuits.

Whether 5V or 3V, many circuits have a narrow voltage tolerance, outside of which the circuit may be damaged or become inoperable. Using the powergoodreset signal 186, the power distribution logic 180 of the system 100 protects the circuits from receiving out-of-tolerance voltages. When the system is first turned on, the voltage rails are supplied with the appropriate voltage, a process that is not instantaneous. The power distribution logic 180 monitors the voltage rails, and, after the voltages are stabilized, asserts the power good signal 486.

Since the power distribution logic 180 is shared between the N domains of the system 100, the powergoodreset signal 186 is likewise common between domains. As shown in FIGS. 6A and 6B, the power good reset signal 186 is asserted by the domain zero reset handler 182A. Reset handlers 182B–182N are not used to assert the powergoodreset signal 186. The signal 186 traverses three paths such that the processor(s) and I/O devices 198A, 198B, . . . , 198N receive the signal simultaneously, whether the system is partitioned into multiple domains (FIG. 6A) or not (FIG. 6B).

The power good reset logic of the system 100 thus ensures that all circuitry receives the power good reset signal 186, irrespective of whether the system is partitioned or not. When the system 100 is not partitioned, the reset handler 182A issues both hard resets and power good resets for all circuitry. When the system 100 is partitioned, the reset handlers for the respective domains manage the hard reset operations, while the reset handler 182A continues to control the power good reset operations. This ensures that those domains unaffected by a hang condition of another domain are not unnecessarily reset while the voltage rails for all circuits within the system are safely maintained.

Intelligent Chassis Management Bus for Partitionable System

The Intelligent Platform Management Interface, or IPMI, is an interface defined to allow hardware monitoring, error logging, and error recovery using standard methodology for all devices in a microprocessor-based system. The various functions implemented using IPMI occur independent of the microprocessors, firmware, and software running in the system. (IPMI is a co-development of Intel Corporation of Santa Clara, Calif., Hewlett-Packard Company of Palo Alto, Calif., NEC Corporation of Tokyo, Japan, and Dell Computer Corporation of Austin, Tex. The IPMI Specification, Version 1.5, Revision 1.1, was published on Feb. 20, 2002.)

Although not limited to multiprocessing systems, IPMI is typically employed in server and other high-end operating environments, in which multiple systems are linked to one another, such as on a network. IPMI defines two buses, the Intelligent Platform Management Bus (IPMB) and the Intelligent Chassis Management Bus (ICMB), for intra-chassis and inter-chassis management, respectively.

The Intelligent Platform Management Bus (IPMB), or intra-chassis bus, is a serial bus that connects major system modules within a domain of a microprocessor-based system. Functioning independently from the main processor or processors, a baseboard management controller (BMC) performs "platform management" of the various modules connected to the IPMB within the chassis. This includes monitoring qualitative events such as temperature, voltage, fan rotation speed, processor failure, bus failure, and other occurrences.

Inter-chassis communication occurs using the Intelligent Chassis Management Bus (ICMB), or inter-chassis bus. Also controlled by the BMC, the ICMB is an RS485-based multi-drop bus that allows platform management information to be communicated between multiple interconnected chassis.

Figure 7A:
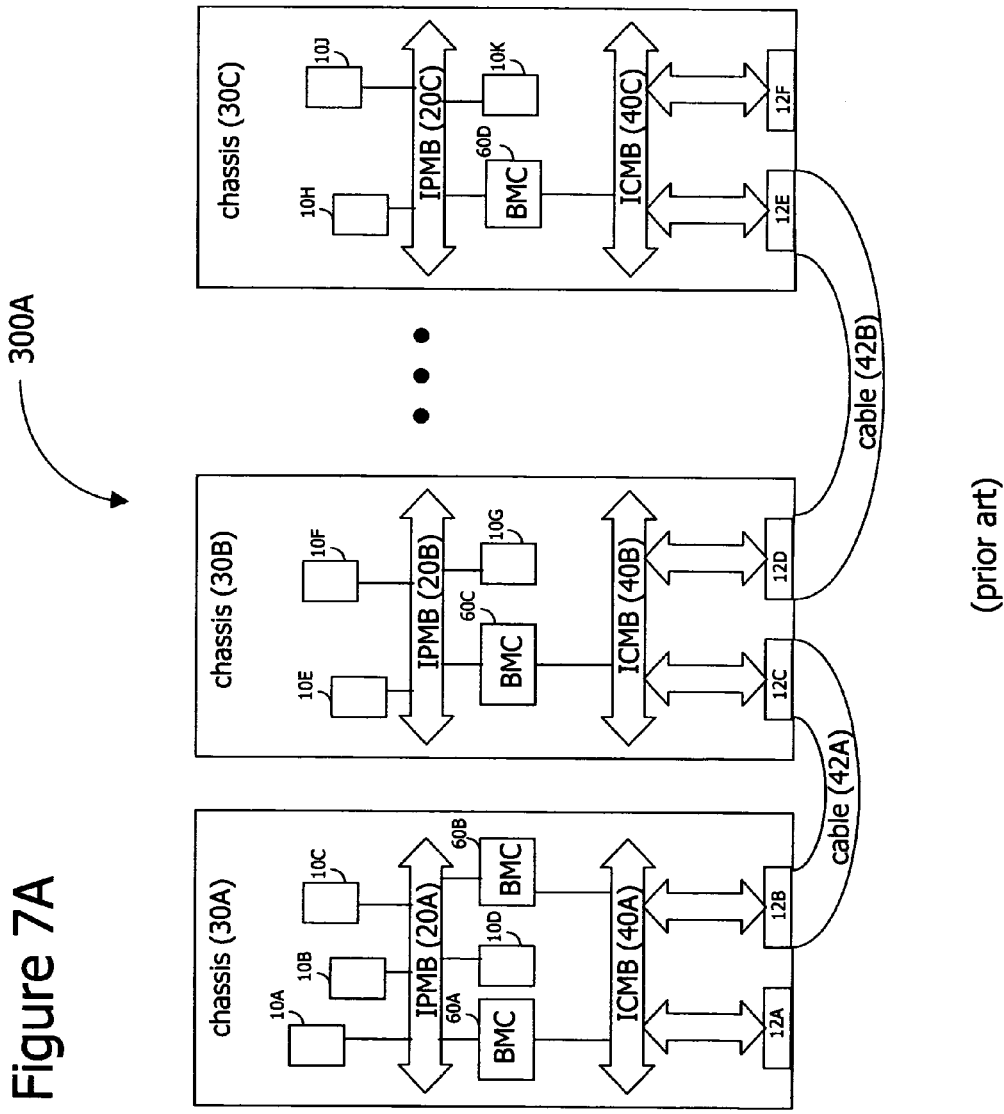
FIG. 7A is a block diagram of an N-chassis system in which the partitionable chassis are linked by an intelligent chassis management bus (ICMB), according to the prior art.

In the block diagram of FIG. 7A, an IPMI-capable system 300A includes three chassis 30A, 30B, and 30C (collectively, chassis 30) of an N-domain configuration.

As used herein, the term chassis is defined to be a structural enclosure for housing the circuitry of a microprocessor-based system, whether the system employs one or multiple microprocessors, system boards, and so on. The chassis 30A, 30B, or 30C may be partitionable systems, such as the system 100, described above.

Each chassis includes multiple system modules connected together by an IPMB. In the chassis 30A, for example, system modules 10A, 10B, 10C, and 10D (collectively, system modules 10) are shown, connected by the IPMB 20A. The system modules 10 represent components commonly found in processor-based systems. For example, the system modules 10 may include a memory controller, a small computer systems interface (SCSI) controller, a bridge controller, a peripheral component interconnect (PCI) device, a universal serial bus (USB) device, and so on. Devices that reside on the IPMB directly are able to understand and process appropriate IPMI commands. Those devices that do not process IPMI commands may reside on private buses connected to the BMC, with the BMC interpreting IPMI commands on their behalf. Further, the system includes two baseboard management controllers (BMC) 60A and 60B, for implementing platform management under IPMI.

Each chassis 30 includes two ICMB connectors, which may be electrically connected internally to combine ICMB segments into a single bus, enabling the ICMB to connect to multiple chassis in a daisy-chain manner, thus enabling inter-chassis management capability between the chassis. The system 300A includes connectors 12A, 12B, 12C, 12D, 12E, and 12F (collectively, connectors 12). Chassis 30A, for example, includes connectors 12A and 12B; chassis 30B includes connectors 12C and 12D; and chassis 30C includes connectors 12E and 12F.

The chassis 30A, 30B, and 30C are coupled together by cables 42A and 42B, to form a multi-drop bus (ICMB) between all chassis 30. The cable 42A connects to an ICMB 40A in the chassis 30A and to an ICMB 40B in the chassis 30B. Likewise, the cable 42B connects the ICMB 40B in the chassis 30B to an ICMB 40C in the chassis 30C. Together, the ICMB 40A, 40B, and 40C (collectively, ICMB 40) allow inter-chassis management under IPMI. Additional cable connections to the chassis 30A (using the connector 12A) and/or the chassis 30C (using the connector 12F) may further extend the ICMB 40.

By connecting one or more ICMB buses together using the connectors 12, a true communications bus is achieved in the system 100. Each entity connected to the ICMB observes all transmit and receive signals that are put on the ICMB, whatever the source of those signals. The ID signals, however, are not bused. Instead, each ID signal is associated with a single connector 12, according to some embodiments.

Two BMCs 60A and 60B reside in the chassis 30A while the chassis 30B and 30C each include a single BMC 60C and 60D, respectively (collectively, BMCs 60). Each BMC is coupled to both connectors within its chassis via the respective portion of the ICMB 40. Thus, for example, the BMCs 60A and 60B are connected to both the connector 12A and 12B by way of the ICMB 40A. The BMC 60C is connected to the connectors 12C and 12D by way of the ICMB 40B and the BMC 60D is connected to the connectors 12E and 12F by way of the ICMB 40C.

The ICMB 40 enables communications access to IPMI functions (i.e., IPMI messaging) to be implemented between multiple chassis of the system 300A. The BMC and IPMB are powered from standby and may be powered separately from the other system modules 10 in each chassis, making it possible to obtain platform management information even when one or more chassis are powered down. Thus, either the BMC 60A or the BMC 60B on the chassis 30A can communicate with the BMC 60D on the chassis 30C to obtain qualitative information about the system module 10K, for example, even when the chassis 30B is powered down.

Figure 7B:
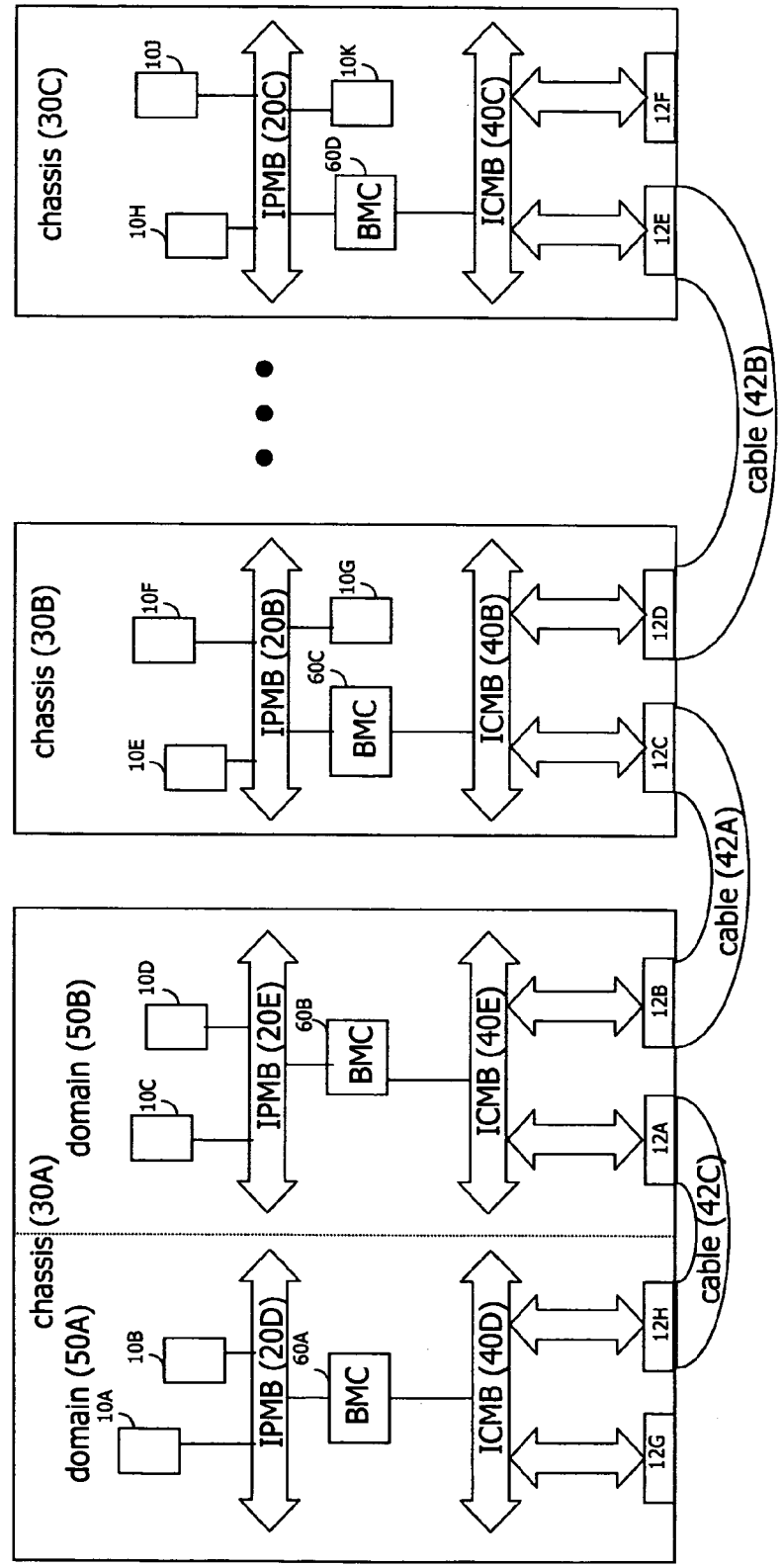
FIG. 7B is a block diagram of the N-chassis system of FIG. 7A, in which one of the chassis is partitioned into two domains, each domain having two ICMB connectors, according to some embodiments.

In FIG. 7B, a second system 300B is depicted, in which the chassis 30A of FIG. 7A has been partitioned into two separate domains 50A and 50B (collectively, domains 50). The system modules 10A and 10B, and the BMC 60A, which are connected together by an IPMB 20D, are functionally separated from the system modules 10C and 10D, as well as the BMC 60B, which are themselves connected together by an IPMB 20E. The domain 50A, which may have its own processor, memory, and operating system, functions independently from the domain 50B. The architecture of the chassis 30A, which may include specialized circuitry such as the Intel E8870 chipset, makes such partitioning possible.

Preferably, platform management can be performed on the independent domains 50A and 50B of the chassis 30A. For example, the BMC 60D on the chassis 30C should be able to monitor both the system module 10B (on the domain 50A) and the system module 10D (on the domain 50B). FIG. 7B shows a configuration in which the platform management capability is assured. In addition to the connectors 12A and 12B previously shown in FIG. 7A on the chassis 30A (now part of the domain 50B), two additional connectors 12G and 12H are coupled to the domain 50A. The ICMB 40A of FIG. 7A has been replaced by distinct ICMBs 40D and 40E, one for each domain. A cable 42C, coupled between the connectors 12A and 12H, extends the ICMB 40 to include the ICMBs 40D and 40E. From the ICMB view, the domains 50A and 50B appear as separately managed chassis, even though the domains occupy a single chassis 30A.

Where the chassis 30A (or any other chassis in the system 300B) are further partitioned into additional domains, the principles embodied in FIG. 7B can be scaled accordingly. By providing two additional connectors (and one additional cable) for each new domain, flexibility is provided for various ICMB interconnect topologies and platform management for all domains of the chassis is available.

For some applications, such as in cost-conscious system designs or where available board space is limited, the use of two connectors and a cable for each domain may be undesirable. Where partitioning is an optional feature, the additional connectors and cable will not be used if partitioning is not selected. Also, where partitioning into more than two domains is supported, the two additional connectors and a cable for each domain may be cost-prohibitive.

Figure 7C:
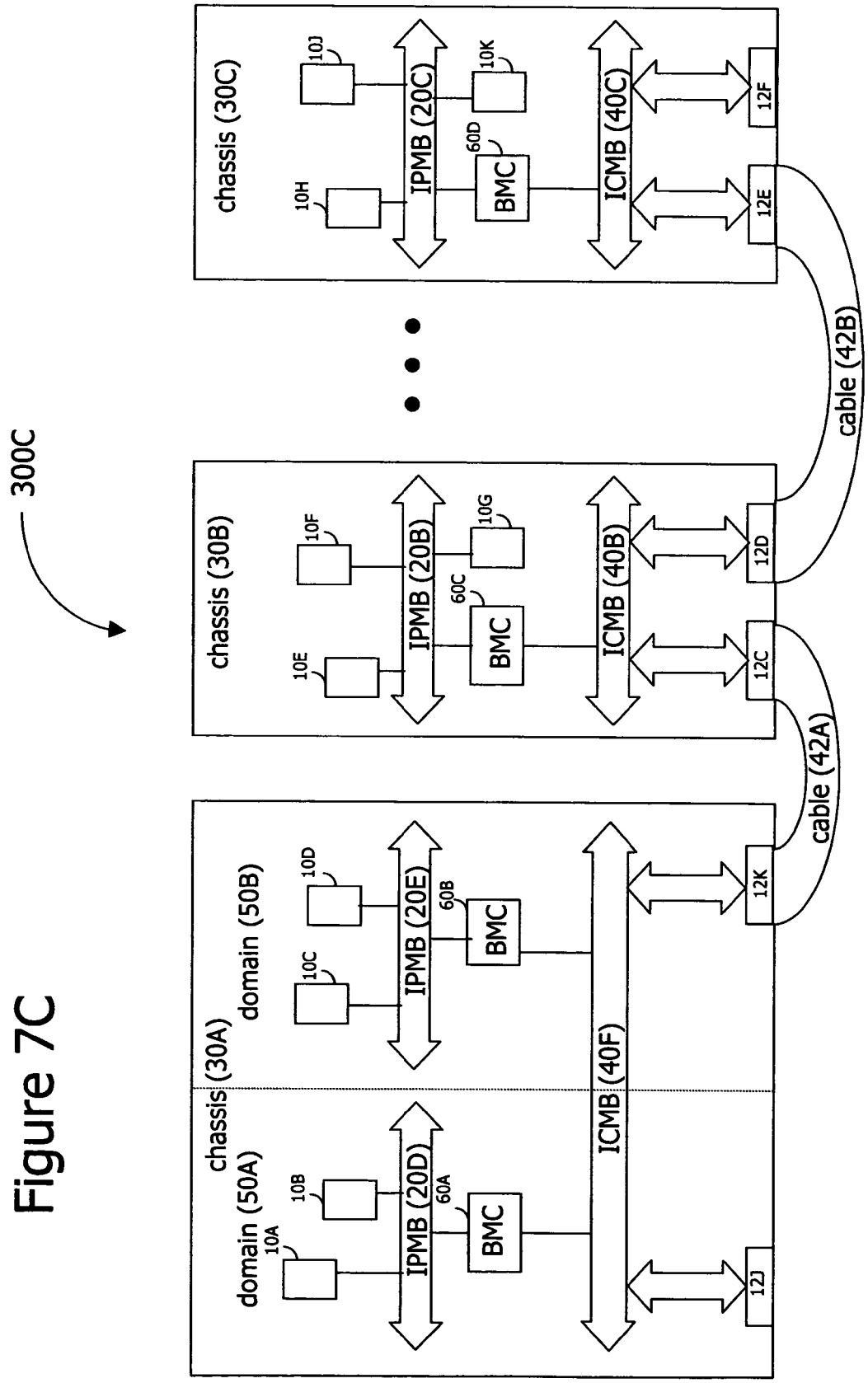
FIG. 7C is a block diagram of the N-chassis system of FIG. 7A, in which one of the chassis is partitioned into two domains, each domain sharing two ICMB connectors, according to some embodiments.

It is thus preferable, for some applications, that the connectors 12 be shared between the domains of a single chassis. In FIG. 7C, for example, according to some embodiments, a system 300C includes a partitioned chassis 30A which includes only two connectors 12J and 12K. Instead of adding an external ICMB cable, such as the cable 42C of FIG. 7B, the ICMB functionality, shown as ICMB 40F, is shared between the domains 50A and 50B, internal to the chassis 30A. Thus, both of the domains 50A and 50B are accessible by the other chassis 30B and 30C for platform management operations. Further, both of the BMCs 60A and 60B in the chassis 30A have access to the connectors 12J and 12K through the ICMB 40F.

Figure 8:
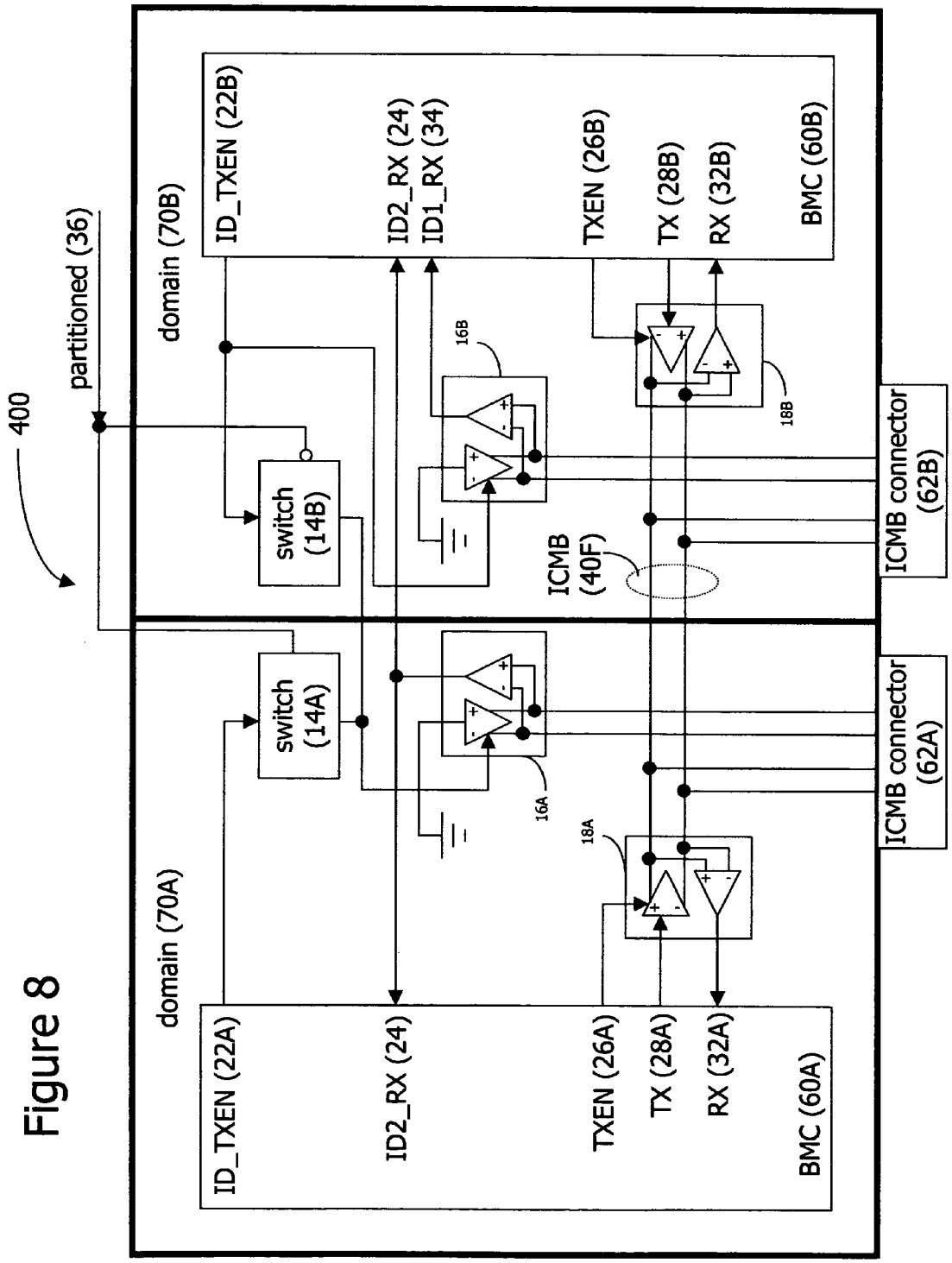
FIG. 8 is a block diagram of the N-chassis system of FIG. 7C, including two baseboard management controllers, according to some embodiments.

In FIG. 8, a block diagram of a partitionable system 400 illustrates the internal sharing of the ICMB by the two domains, according to some embodiments. The system 400 may be part of a partitionable chassis such as the chassis 30A of FIG. 7C. Two domains 70A and 70B and two connectors 62A and 62B (collectively, connectors 62) are depicted, with the connector 62A associated with the domain 70A and the connector 62B associated with the domain 70B. When the system 400 is partitioned, a partitioned signal 36 is activated and received by both domains. The partition enable bit 124 in the NVRAM 114 (FIG. 1), for example, may control the partition signal 36.

Each domain includes a baseboard management controller (BMC), BMC 60A for domain 70A and BMC 60B for domain 70B (collectively, BMCs 60). As described above, the BMCs perform platform management under IPMI. In some embodiments, a chassis bridge controller (CBC), also known as an ICMB bridge controller, within the BMC, performs the operations described in FIG. 8.

When the system 400 is unpartitioned, only one BMC 60B is active. The BMC 60B is thus considered the host BMC (an arbitrary choice). In the unpartitioned state, the BMC 60B controls all transmit and receive operations through the connectors 62A and 62B.

The system 400 supports four identification (ID) signals, as depicted in FIG. 8. The BMC 60B supports the ID_TXEN 22B, ID2_RX 24, and ID1_RX 34 signals while the BMC 60A supports the ID_TXEN 22A and ID2_RX 24 signals. These ID signals are not bused to all entities connected to the ICMB, but are only recognizable to entities connected directly to an associated connector. Looking at FIG. 7C, for example, the BMC 60C in the chassis 30B would be able to identify ID signals coming from the BMC 60B because those signals are associated with the connector 12K. Since the BMC 60C is connected directly to the connector 12K (by way of the cable 42A), the BMC 60C sees the issued ID signals. The BMC 60D, by contrast, would not be able to see ID signals issued from the BMC 60B. However, the BMC 60D would be able to query the BMC 60C for such information.

Returning to FIG. 8, the BMC 60B further supports output signals, TXEN 26B and TX 28B, as well as input signal, RX 32B. The BMC 60A also supports output signals, TXEN 26A and TX 28A, as well as input signal RX 32A.

Because the TX and RX signals are bused, devices connected to the ICMB can access transmit and receive data, whether intended for the particular device or not. The same is not true for the ID signals. Rather than being bused to the entire ICMB, the ID signals are each associated with a single connector. Only BMCs connected directly to a given connector along the ICMB will see the ID signal associated with that connector. A single BMC can handle ID signals for multiple connectors in a chassis, or, as in the partitioned case, the responsibility for handling the ID signals of different connectors can be assigned to different BMCs.

An internal bus, ICMB 40F, is coupled to both the ICMB connectors 62A and 62B, as shown. The TXEN 26A, TX 28A, and RX 32A signals (BMC 60A) and the TXEN 26B, TX 28B, and RX 32B signals (BMC 60B) are connected to the ICMB 40D through transceivers 18A and 18B, respectively. Thus, signals may be electrically transmitted between the BMC 60A and the connector 62A, the BMC 60A and the connector 62B, the BMC 60B and the connector 62A and the BMC 60B and the connector 62B. Put another way, both domains 70A and 70B are accessible from a remote chassis that is connected to the connectors 62A or 62B, for performing platform management under IPMI.

Discovery of which connector is being used to attach to another chassis by the system 400 through one or more of the ICMB connectors 62 (also known as topology discovery) is achieved by either transmitting the ID_TXEN signal 22A (for the BMC 60A) or the ID_TXEN signal 22B (for the BMC 60B) to both the connectors 62B and 62A. In the unpartitioned state, the host BMC 60B "owns," or is identified with, and can query for current chassis connection to both connectors 62A and 62B by controlling their identifiers, or IDs.

The ID signals are used to identify whether a chassis is coupled to the system 400 via one of the connectors. Using a combination of direct "get ID" commands and indirect ID commands (such as by querying the BMCs in other chassis for their connections), the external interconnect topology of the system 400 can be discovered. Once discovered, any BMC within any chassis of the shared ICMB may communicate with any other chassis or BMC in the topology. It is possible that some BMCs within a system may not operate as host controllers, such as those that support power supplies. Such BMCs merely respond to status queries, but do not engage in topology discovery. However, it is theoretically possible for any BMC to communicate with other BMCs along the IPMB regardless of their host status.

The ID_TXEN signal 22B from the host BMC 60B enables the transceiver 16B to drive an active "ID" (differential) signal to the connector 62B. If a chassis is connected at the connector 62B, the BMC for the connected chassis (not shown) transmits a response signal back through the connector 62B, to the host BMC 60B (via the transceiver 16B), as the ID1_RX 34 signal. The response signal ID1_RX 34 indicates that a chassis is present at the connector 62B. Thus, the domain 70B can identify the presence of a chassis at the connector 62B, whether the system 400 is partitioned or not.

The ID_TXEN signal 22B likewise can identify the presence of a chassis connected to the connector 62A. A switch 14B arbitrates whether the ID_TXEN signal 22B is received at the connector 62A. When the system 400 is partitioned, the partition signal 36 is active, and the switch 14B prevents the ID_TXEN signal 22B from being sent to the connector 62A. However, the active partition signal 36 also enables another switch 14A, which allows the BMC (60A) to send its own ID_TXEN signal 22A to enable the transceiver 16A to drive an active ID (differential) signal to the connector 62A. The two switches 14A and 14B work in concert, such that, at any instance, only one controller 60 has access to the connector 62A.

The non-host BMC 60A can identify the presence of a chassis at the connector 62A (when the system 100 is partitioned) but not at the connector 62B (except by querying the host BMC 60B to identify such presence). The BMC 60A sends its ID_TXEN signal 22A, but the switch 14A lets the signal transmit to the connector 62A only if the partitioned signal 36 is active.

If a chassis is present at the connector 62A, its BMC sends a response signal, ID2_RX 24, through the transceiver 16A, to be received both by the host BMC 60B and the non-host BMC 60A. No switch exists on the ID2_RX 24 signal, as both BMCs will act appropriately to the ID2_RX 24 signal, according to which BMC has elicited the ID2_RX 24 signal response.

Once a chassis has been identified as connected to a domain, communication between the respective BMC of the domain and the identified chassis can take place along the ICMB 40D. Each transceiver is controlled by the respective TXEN signal (26A for the secondary BMC 60A and 26B for the host BMC 60B). In addition, connection status can be transmitted to other BMCs in the ICMB topology, allowing any BMC to communicate with any other BMC in the topology.

In the partitioned state, the BMC 60B "owns," or is identified with, the connector 12B for topology discovery while the BMC 60A "owns," or is identified with, the connector 12A for topology discovery. The domains 70B and 70A share the ICMB 40F, while each of the two external ICMB connectors belong to the end partitions, thereby providing a unique connector identifier for each partition. By eliminating two RS-485 connectors from the chassis backplane, the system 400 is less costly than prior art solutions, while still providing chassis management for domain-partitionable systems.

Figure 9A:
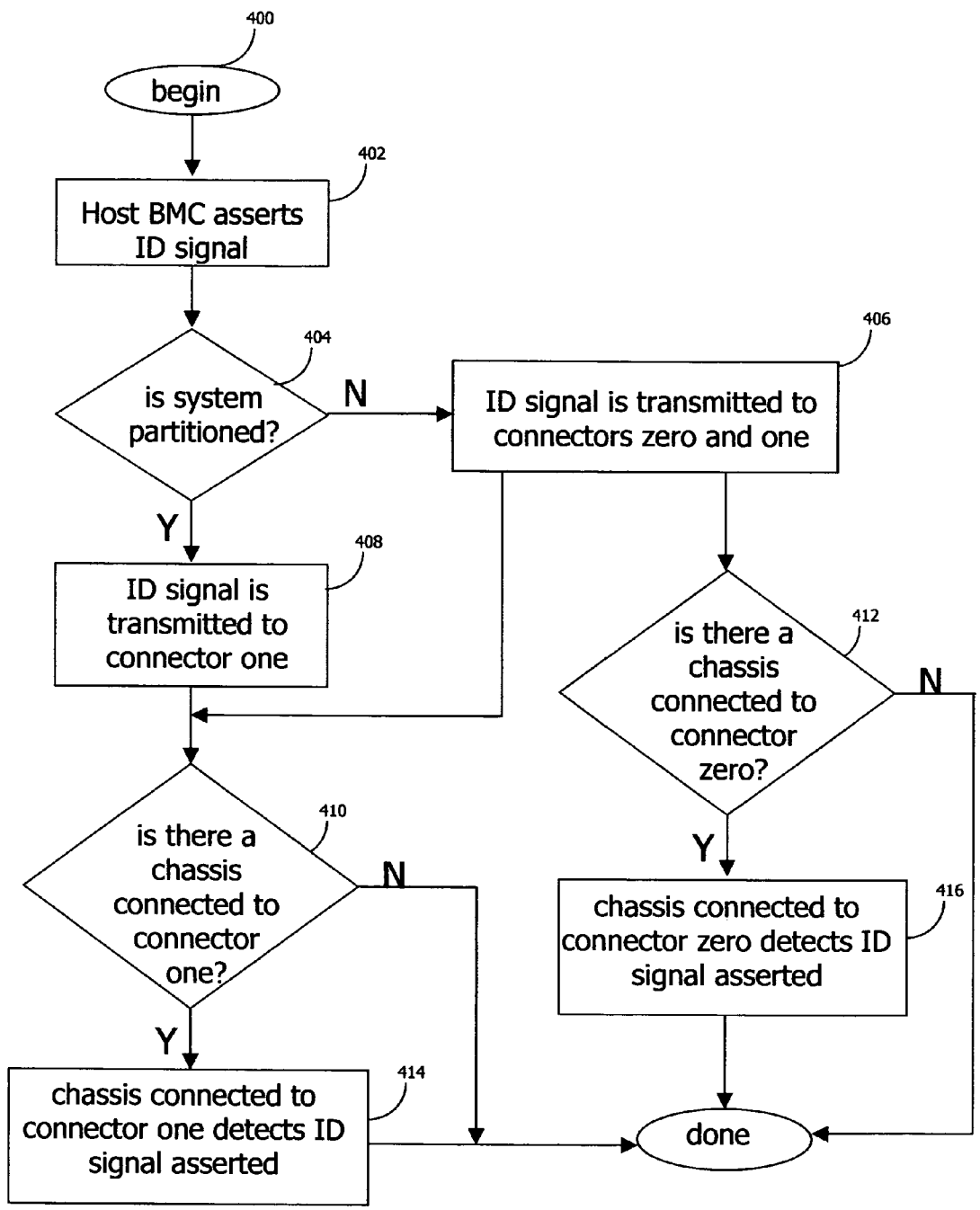
FIGS. 9A and 9B are flow diagrams, depicting operation of the chassis bridge controllers of FIG. 8 in identifying connected chassis, according to some embodiments.
Figure 9B:
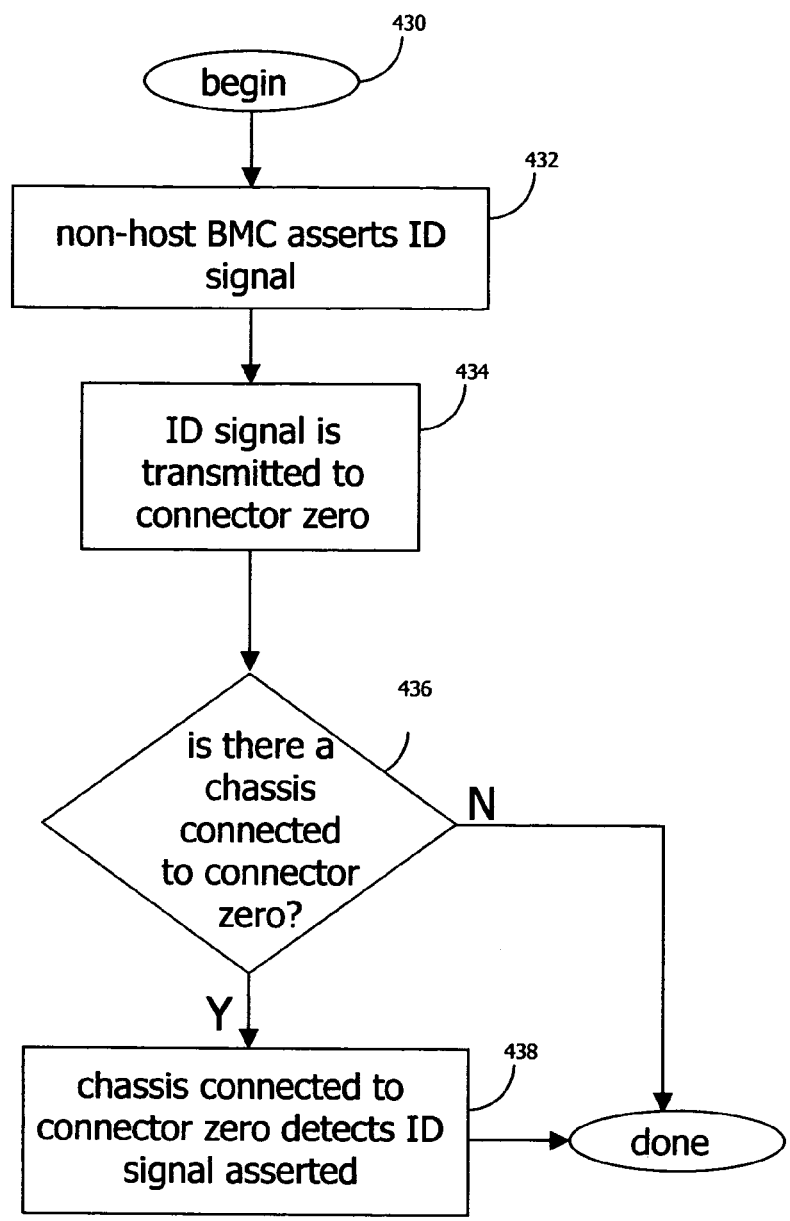

FIGS. 9A and 9B are flow diagrams for illustrating how the BMC 60B and 60A, respectively, identify one or more chassis connected to the system 400. The operations of FIGS. 9A and 9B may occur simultaneously or separately. As illustrated in the flow diagrams, the detection of connected chassis by the host BMC is distinct from that performed by the non-host BMC.

FIG. 9A depicts the host BMC 60B operation for the partitionable system 400. An ID signal (ID_TXEN 22B) is asserted by the BMC 60B (block 402). If the system 400 is not partitioned (the "no" prong of block 404), the ID signal is sent to both connector 62A (connector zero) and connector 62B (connector one) (block 406). If the system 100 is partitioned, the ID signal is only transmitted to connector one (block 408).

Whether the system 400 is partitioned or not, subsequent operations depend on a response being received by the one or more remote chassis. When the system 400 is partitioned, the host BMC 60B communicates with connector one alone, for direct-connect topology discovery. Accordingly, if a remote chassis is coupled to connector one (block 410), the chassis detects the asserted ID signal (block 414). Direct connection between the system 400 and the remote chassis is thus discovered.

Where the system 400 is not partitioned, the host BMC 60B communicates with both connector 62A (connector zero) and connector 62B (connector one) for topology discovery. Accordingly, one or more remote chassis may detect the asserted ID signal (block 416). Again, connection between the one or more remote chassis and the system 400 is discovered.

In FIG. 9B, operation of the non-host BMC 60A for the partitionable system 400 is shown. Similar to the host BMC, the BMC 60A asserts an ID signal (ID_TXEN 22A) (block 432). If the system is not partitioned, the ID signal is not received by a connector, and, thus, has no effect. If the system is partitioned, the ID signal is transmitted to connector zero (block 434). The ID signal from the BMC 60A is not transmitted to connector one. Once a chassis is coupled to connector zero (block 436), it detects the asserted ID signal (block 438). Connection between the remote chassis and the system 400 is thus discovered.

While the invention has been described with respect to a limited number of embodiments, those skilled in the art will appreciate numerous modifications and variations therefrom. It is intended that the appended claims cover all such modifications and variations as fall within the true spirit and scope of the invention.

We claim:

1. A system, comprising:
   a plurality of processors;
   a first plurality of boot-capable devices to supply a first plurality of interrupts;
   a second plurality of boot-capable devices to supply a second plurality of interrupts; and
   an interrupt controller subsystem, comprising a first programmable interrupt controller and a second programmable interrupt controller; wherein:
   if the system is partitioned into a first domain and a second domain:
   the first plurality of interrupts are received by the first programmable interrupt controller;
   a first processor-interrupting signal is generated by the first programmable interrupt controller, the first processor-interrupting signal to interrupt a first processor of the plurality of processors, wherein the first processor is in the first domain;
   the second plurality of interrupts are received by the second programmable interrupt controller; and
   a second processor-interrupting signal is generated the second programmable interrupt controller, the second Processor-interrupting signal to interrupt a second processor of the plurality of processors, wherein the second Processor is in the second domain; and if the system is not partitioned:
   the first plurality of interrupts and the second plurality of interrupts are received by the first programmable interrupt controller;
   the first processor-interrupting signal is generated by the first programmable interrupt controller, the first processor-interrupting signal to interrupt the first processor of the plurality of processors and the first processor-interrupting signal to cause a third processor-interrupting signal to be generated, the third processor-interrupting signal to interrupt the second processor of the plurality of processors.

2. The system of claim 1, further comprising:
   a signal path to route the second plurality of interrupts to the first interrupt controller when the system is not partitioned.

3. The system of claim 2, further comprising;
   firmware executed by the first processor, the firmware to program the interrupt controller subsystem such that the second proqrammable interrupt controller is not enabled when the system is not partitioned.

4. The system of claim 2,
   the interrupt controller subsystem further comprising a multiplexer to receive the first processor-interrupting signal or the second processor-interupting signal, wherein the multiplexer sends the third processor-interupting signal to the second processor when the system is partitioned and the second processor-interrupting signal is received.

5. The system of claim 4, wherein the multiplexer sends the third processor-interrupting signal to the second processor when the system is unpartitioned and the first processor-interrupting signals received.

6. The system of claim 1, further comprising power distribution logic to generate a power good reset signal, wherein the power good reset signal is received by the first domain and the second domain when the system is partitioned.

7. The system of claim 1, further comprising a first domain reset handler and a second domain reset handler, wherein the first domain reset handler issues a first hard reset to the first domain when the system is partitioned and the second domain reset handler issues a second hard reset to the second domain when the system is partitioned.

8. The system of claim 1, further comprising:
   a first bit to indicate that the first domain is to be cojoined with the second domain; and
   a second bit to indicate that the second domain is to be cojoined with the first domain;
   wherein the system is changed from a partitioned state to an unpartitioned state when the first bit and the second bit are set.

9. The system of claim 7, the power distribution logic further comprising:
   a two-input multiplexer to receive the first hard reset and the second hard reset, the two-input multiplexer being driven by an indicator of whether the system is partitioned, the two-input multiplexer to generate an output signal, the output signal to reset devices in the first domain.

10. The system of claim 9, wherein the output is generated by the first hard reset signal when the system is unpartitioned.

11. The system of claim 9, wherein the output is generated by the second hard reset signal when the system is partitioned.

12. The system of claim 6, wherein the power good reset signal is received by the first domain and the second domain when the system is unpartitioned.

* * * * *